(12) United States Patent
Ashley, Jr. et al.

(10) Patent No.: US 7,684,782 B2
(45) Date of Patent: Mar. 23, 2010

(54) METHOD AND SYSTEM FOR INITIATING AND HANDLING AN EMERGENCY CALL UTILIZING GEOGRAPHICAL ZONES

(75) Inventors: James Ashley, Jr., Norco, CA (US); Frank Mooney, Brea, CA (US); Patrick Mooney, Brea, CA (US)

(73) Assignee: Wirelesswerx International, Inc. (PA)

( * ) Notice: Subject to any disclaimer, the term of this patent is extended or adjusted under 35 U.S.C. 154(b) by 782 days.

(21) Appl. No.: 11/278,667

(22) Filed: Apr. 4, 2006

(65) Prior Publication Data

US 2006/0234726 A1  Oct. 19, 2006

Related U.S. Application Data

(63) Continuation-in-part of application No. 11/105,931, filed on Apr. 13, 2005, now Pat. No. 7,286,929, and a continuation-in-part of application No. 11/158,720, filed on Jun. 21, 2005, and a continuation-in-part of application No. 11/158,667, filed on Jun. 21, 2005, now Pat. No. 7,317,927.

(51) Int. Cl.
*H04M 11/04* (2006.01)

(52) U.S. Cl. .................. 455/404.2; 455/404.1; 455/564; 379/49

(58) Field of Classification Search .............. 455/404.2, 455/404.1, 564; 379/49
See application file for complete search history.

(56) References Cited

U.S. PATENT DOCUMENTS

| | | | |
|---|---|---|---|
| 3,518,674 A | 6/1970 | Moorehead et al. | |
| 3,772,668 A | 11/1973 | Smith | |
| 4,217,588 A | 8/1980 | Freeny, Jr. | |
| 4,224,596 A | 9/1980 | Knickel | |
| 4,688,026 A | 8/1987 | Scribner et al. | |
| 4,819,860 A | 4/1989 | Hargrove et al. | |
| 4,884,208 A | 11/1989 | Marinelli et al. | |
| 4,958,645 A | 9/1990 | Cadell et al. | |
| 5,142,281 A | 8/1992 | Park | |
| 5,235,633 A | 8/1993 | Dennison et al. | |

(Continued)

FOREIGN PATENT DOCUMENTS

DE  19960219  7/2001

(Continued)

OTHER PUBLICATIONS

WirelessWerx Technical Overview, Manual, Sep. 10, 2003, 21 page(s).

(Continued)

*Primary Examiner*—Danh C Le
(74) *Attorney, Agent, or Firm*—Greenberg Traurig LLP

(57) ABSTRACT

A method and system of making an emergency voice call is disclosed. Location data is received from a positioning device. A location area identifier is determined. The location area identifier corresponds to a geographical area encompassing a geographical location being represented by the location data. A voice call destination number is identified. The voice call destination number is associated with the location area identifier. The voice call destination number is utilized in order to communicate with a public safety answering point.

30 Claims, 21 Drawing Sheets

U.S. PATENT DOCUMENTS

| | | | |
|---|---|---|---|
| 5,365,516 | A | 11/1994 | Jandrell |
| 5,388,147 | A | 2/1995 | Grimes |
| 5,389,934 | A | 2/1995 | Kass |
| 5,479,482 | A | 12/1995 | Grimes |
| 5,528,248 | A | 6/1996 | Steiner et al. |
| 5,546,445 | A | 8/1996 | Dennison et al. |
| 5,617,944 | A | 4/1997 | McTaggart |
| 5,621,785 | A | 4/1997 | Norimatsu |
| 5,627,517 | A | 5/1997 | Theimer et al. |
| 5,642,303 | A | 6/1997 | Small et al. |
| 5,670,944 | A | 9/1997 | Myllymaki |
| 5,699,244 | A | 12/1997 | Clark, Jr. et al. |
| 5,796,634 | A | 8/1998 | Craport et al. |
| 5,835,907 | A | 11/1998 | Newman |
| 5,917,405 | A | 6/1999 | Joao |
| 5,917,414 | A | 6/1999 | Oppelt et al. |
| 5,917,415 | A | 6/1999 | Atlas |
| 5,918,180 | A | 6/1999 | Dimino |
| 5,938,721 | A | 8/1999 | Dussell et al. |
| 5,946,611 | A | 8/1999 | Dennison et al. |
| 6,002,994 | A | 12/1999 | Lane et al. |
| 6,014,089 | A | 1/2000 | Tracy et al. |
| 6,073,013 | A | 6/2000 | Agre et al. |
| 6,102,856 | A | 8/2000 | Groff et al. |
| 6,177,905 | B1 | 1/2001 | Welch |
| 6,198,394 | B1 | 3/2001 | Jacobsen et al. |
| 6,198,914 | B1 | 3/2001 | Saegusa |
| 6,236,358 | B1 | 5/2001 | Durst et al. |
| 6,243,039 | B1 | 6/2001 | Elliot |
| 6,265,978 | B1 | 7/2001 | Atlas |
| 6,300,875 | B1 | 10/2001 | Schafer |
| 6,317,605 | B1 | 11/2001 | Sakuma |
| 6,324,404 | B1 | 11/2001 | Dennison et al. |
| 6,438,382 | B1 | 8/2002 | Boesch et al. |
| 6,446,004 | B1 | 9/2002 | Cao et al. |
| 6,477,363 | B1 | 11/2002 | Ayoub et al. |
| 6,496,116 | B2 | 12/2002 | Farringdon et al. |
| 6,496,575 | B1 | 12/2002 | Vasell et al. |
| 6,509,830 | B1 | 1/2003 | Elliot |
| 6,516,198 | B1 | 2/2003 | Tendler |
| 6,577,897 | B1 | 6/2003 | Shurubura et al. |
| 6,579,231 | B1 | 6/2003 | Phipps |
| 6,599,243 | B2 | 7/2003 | Woltermann et al. |
| 6,611,206 | B2 | 8/2003 | Eshelman et al. |
| 6,617,969 | B2 | 9/2003 | Tu et al. |
| 6,625,457 | B1 | 9/2003 | Raith |
| 6,646,873 | B2 | 11/2003 | Chu-Chia et al. |
| 6,674,368 | B2 | 1/2004 | Hawkins et al. |
| 6,714,133 | B2 | 3/2004 | Hum et al. |
| 6,717,513 | B1 | 4/2004 | Sandelman et al. |
| 6,774,795 | B2 | 8/2004 | Eshelman et al. |
| 6,812,824 | B1 | 11/2004 | Goldinger et al. |
| 6,826,473 | B1 | 11/2004 | Burch et al. |
| 6,847,822 | B1 | 1/2005 | Dennison et al. |
| 6,856,898 | B1 | 2/2005 | Tompkins et al. |
| 6,867,733 | B2 | 3/2005 | Sandhu et al. |
| 6,868,074 | B1 | 3/2005 | Hanson |
| 6,868,410 | B2 | 3/2005 | Fortin et al. |
| 6,922,565 | B2 | 7/2005 | Rhodes et al. |
| 6,944,464 | B2 | 9/2005 | Muranaga |
| 7,016,478 | B2 * | 3/2006 | Potorny et al. ............... 379/49 |
| 2001/0027378 | A1 | 10/2001 | Tennison et al. |
| 2001/0032236 | A1 | 10/2001 | Lin |
| 2001/0040513 | A1 | 11/2001 | McDonald |
| 2002/0028702 | A1 | 3/2002 | Kim |
| 2002/0072348 | A1 * | 6/2002 | Wheeler et al. ............ 455/404 |
| 2002/0111171 | A1 | 8/2002 | Boesch et al. |
| 2002/0147006 | A1 | 10/2002 | Coon et al. |
| 2003/0013462 | A1 | 1/2003 | Adachi |
| 2003/0149526 | A1 | 8/2003 | Zhou et al. |
| 2003/0163287 | A1 | 8/2003 | Vock et al. |
| 2004/0024522 | A1 | 2/2004 | Walker et al. |
| 2004/0036599 | A1 | 2/2004 | Martin et al. |
| 2004/0082840 | A1 | 4/2004 | Chen |
| 2004/0176106 | A1 | 9/2004 | Tendler |
| 2004/0180668 | A1 | 9/2004 | Owens et al. |
| 2004/0201454 | A1 | 10/2004 | Waterhouse et al. |
| 2005/0026627 | A1 | 2/2005 | Boling et al. |
| 2006/0003809 | A1 * | 1/2006 | Boling et al. ............... 455/564 |

FOREIGN PATENT DOCUMENTS

| | | |
|---|---|---|
| EP | 0915398 | 5/1999 |
| EP | 1345148 | 9/2003 |
| GB | 2369966 | 6/2002 |
| WO | WO0041428 | 7/2000 |
| WO | WO0135190 | 5/2001 |
| WO | WO0146926 | 6/2001 |
| WO | WO0163318 | 8/2001 |
| WO | WO03049060 | 6/2003 |

OTHER PUBLICATIONS

WirelessWerx TrakWERX II SMS/Satellite Dual Mode Tracking Unit, Manual, Nov. 17, 2003, 23 page(s).
WirelessWerx Training Outline, Manual, Oct. 29, 2004, 49 page(s).
WirelessWerx System Description Tucson01, Manual, Feb. 08, 2006, 12 page(s).
WirelessWerx Requirements Specification Tucson01, Manual, Feb. 27, 2006, 41 page(s).
International Search Report for International Application No. PCT/US2005/037529 Dated Mar. 6, 2006.
International Search Report for International Application No. PCT/US2005/037526 Dated Apr. 25, 2006.

* cited by examiner

FIG. 14

METHOD AND SYSTEM FOR INITIATING AND HANDLING AN EMERGENCY CALL UTILIZING GEOGRAPHICAL ZONES

RELATED APPLICATIONS

This application is a Continuation-In-Part of U.S. patent application Ser. No. 11/105,931, filed Apr. 13, 2005, now U.S. Pat. No. 7,286,929. This application is also a Continuation-In-Part of U.S. patent application Ser. No. 11/158,720, filed Jun. 21, 2005. This application is also a Continuation-In-Part of U.S. patent application Ser. No. 11/158,667, filed Jun. 21, 2005 now U.S. Pat. No. 7,317,927. This application is also related to U.S. patent application Ser. No. 11/158,667, filed Jun. 21, 2005. This application is also related to U.S. patent application Ser. No. 11/158,720, filed Jun. 21, 2005. The disclosures of all previously referenced applications are hereby incorporated by reference in their entirety.

BACKGROUND

1. Field of the Disclosure

The present disclosure relates to telecommunication systems. In particular, it relates to telecommunications systems to initiate and handle emergency calls such as 911 calls.

2. General Background

Emergency calls to emergency service, such as 9-1-1, are increasingly originated from portable wireless devices such as cellular telephones. Establishing the responsible public safety answering point (PSAP) for each emergency call is crucial. Because of the natural mobility of cellular phones, establishing the responsible public safety answering point to handle the call has become increasingly difficult. In addition providing for accurate updates of the location of the portable wireless device to the public safety answering point is also critical.

SUMMARY

In one aspect, there is a method of making an emergency voice call. A location area identifier that represents a geographical area in which the portable computing device is located is determined. A coverage area identifier that matches the location area identifier can be further determined. The coverage area identifier represents an emergency service area being serviced by a public safety answering point. A voice call destination number associated with the coverage area identifier is identified. The voice call destination number is utilized in order to communicate with the public safety answering point.

The location area can be a pixilated image. In addition, the geographical area can be an irregular area. The emergency service area can also be an irregular area.

In a further aspect of the method, the voice call destination number can be a telephone number of the public safety answering point or an Internet protocol address of the public safety answering point.

Furthermore, the coverage area identifier and the location area identifier are correlated in a lookup table. The lookup table can reside in the portable computing device or a remote server. Moreover, the coverage area identifier and the voice call destination number are correlated in a lookup table. The lookup table can reside in the portable computing device or a remote server. The method can further comprise receiving an emergency call input from a user to initiate the emergency voice call. Alternatively, the emergency voice call can be automatically initiated if a preconfigured event occurs.

Furthermore, personal data associated with a user of the portable computing device can also be transmitted to the public safety answering point. Personal data includes a medical condition, contact information of a relative, or blood type of the user.

Other aspects of the method can also exist. For example, the emergency voice call can be transmitted to the public safety answering point through a cellular network, a public switched network, or an Internet protocol network. In another example, the location data can be transmitted through a data link or a voice link. In yet another example, the portable computing device is a personal data assistant, a cellular telephone, a smart phone, or a laptop computer. In addition, location data can be transmitted to a communication data interface module at the public safety answering point.

In one aspect, there is a method of making an emergency voice call from a portable computing device. Location data is received from a positioning device. A location area identifier is determined. The location area identifier corresponds to a geographical area encompassing a geographical location being represented by the location data. A voice call destination number is identified. The voice call destination number is associated with the location area identifier. The voice call destination number is utilized in order to communicate with a public safety answering point.

In another aspect, there is a portable computing device to make an emergency voice call. The portable computing device comprises a positioning device receives location data, a processor, and a dialing module. The processor determines a location area identifier corresponding to a geographical area encompassing a geographical location being represented by the location data. The processor can be configured to identify a voice call destination number associated with the location area identifier. The dialing module utilizes the voice call destination number in order to establish communication with a public safety answering point.

In another aspect, there is a method of making a voice call form a portable computing device. A location area identifier that represents a geographical area in which the portable computing device is located is determined. A coverage area identifier that matches the location area identifier can also be determined. The coverage area identifier represents a service area being serviced by a call center. A voice call destination number associated with the coverage area identifier can be further determined. The voice call destination number can be utilized in order to communicate with the call center.

DRAWINGS

By way of example, reference will now be made to the accompanying drawings.

FIG. 14 illustrates a screenshot of a user interface for customizing user information to be reported to the public safety answering point.

DETAILED DESCRIPTION

Figure 1:
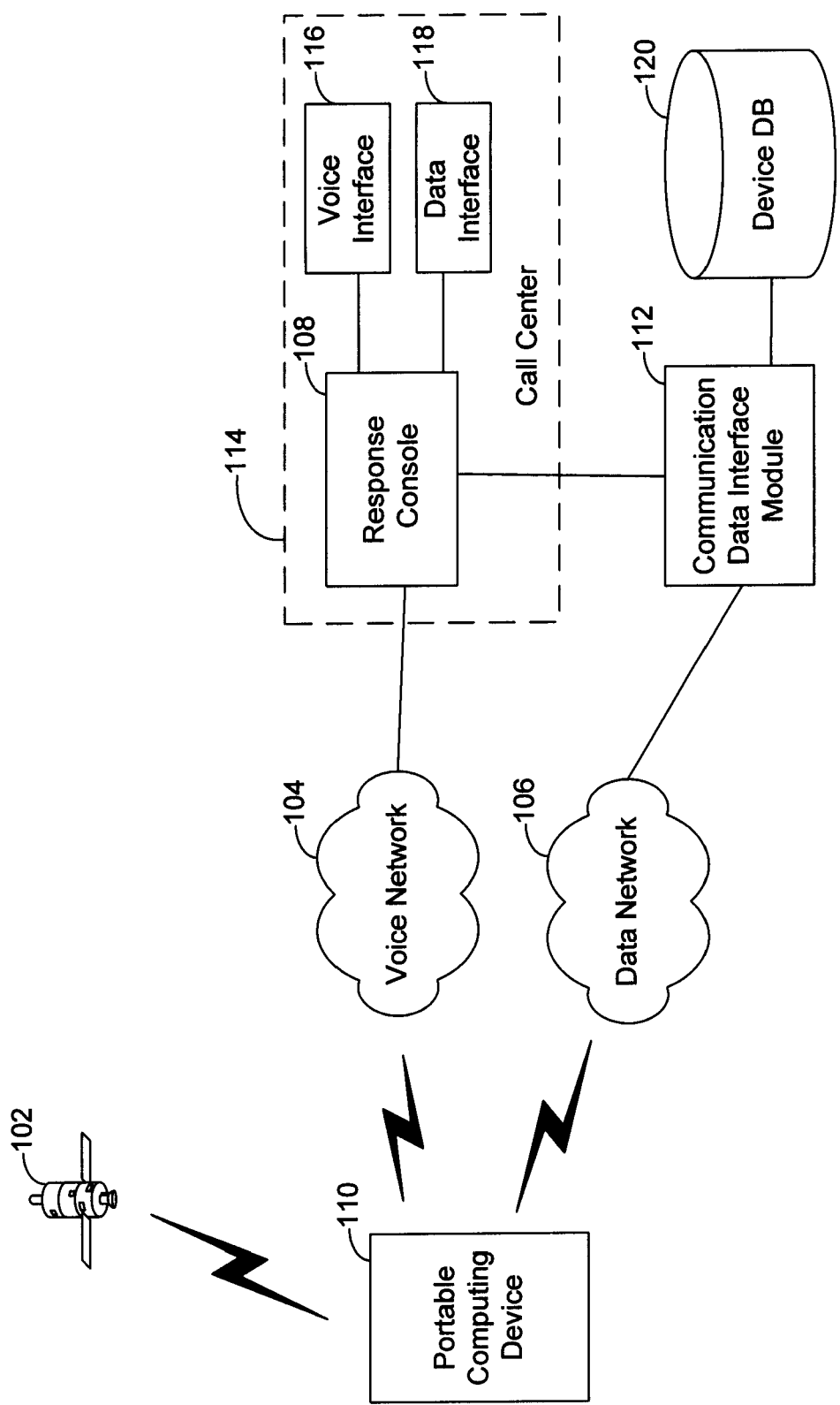
FIG. 1 illustrates a system for communication between a portable computing device and a control center.

The present system and method permits a portable computing device to make an emergency call to an emergency center directly (e.g. directly dialing the telephone number of the responsible emergency center) independent of movement of the portable computing device. Therefore, routing mechanisms and infrastructure are bypassed and circumvented so as to establish an emergency call faster and more efficiently. The present system and method also permits a portable computing device to update a call center, such as an emergency call center, of the location change of the portable computing device. In one embodiment, the updates can be performed utilizing dual-tone multi-frequency (DTMF) tones.

The system and method disclosed herein provides a portable computing device configured to directly contact the public safety answering point that is responsible to handle the call by the portable computing device. The public safety answering point responsible to handle the call is identified by the portable computing device by performing a search in a database stored in the portable computing device. In another embodiment, the portable computing device requests a server to provide the public safety answering point responsible to handle an emergency call by the computing device.

The portable computing device can determine the responsible public safety answering point by utilizing various searching methods and algorithms. In one embodiment, a lookup table having data pairs (e.g., cellular base station, public safety answering point identifier) indicative of the call receiving points for which each public safety answering point is responsible can be utilized. Examples of call receiving points are cellular base station or WiFi antennas. The call receiving point through which the call is to be made is determined. The call receiving point identifier is searched in the lookup table, and the corresponding public safety answering point is established as the responsible public safety answering point.

In another embodiment, the portable computing device includes a positioning device, such as a ground positioning system (GPS) receiver that obtains the location of the portable computing device. Geographical zones marked by irregular boundaries can also be stored in the computing device. The public safety answering point responsible for the zone in which the device is located is established as the responsible public safety answering point. The computing device can then establish a geographical zone in which the portable computing device is located. Furthermore, the computing device can identify the public safety answering point assigned to serve the geographical zone in which the portable computing device is located.

In addition, as the portable computing device, new location information can be updated by transmitting DTMF tones from the wireless device to the public safety answering point. A combination of DTMF tones can be utilized to transmit a latitude and longitude position change. The DTMF tones can be transmitted over an Internet Protocol (IP) network, a cellular network, or any other communications network.

As such, a voice call from a portable computing device can include originator location data such that at the receiving site, the caller identifier ANI (automatic number identification), and physical location of the caller. This information can be made available to a public safety answering point operator in real time during the voice call. In addition, correct location information can be provided to the public safety answering point operator in compliance with current U.S. Federal Communications Commission guidelines for 911 location identification.

FIG. 1 illustrates a system for communication between a portable computing device and a control center. A portable computing device 110 can communicate wirelessly through multiple communications networks. In one example, the portable computing device 110 can communicate through a voice network 104 with a response console 108. The response console 108 permits an operator to handle an incoming call from the portable computing device 110. The operator can utilize a voice interface 116 to interact and carry a voice conversation with the user of the portable computing device 110. In one example, the voice network can be a telephone network. In another example, the voice network can be an IP network.

In addition, the portable computing device 110 can communicate with a data network 106 to transmit data (e.g. data packets) to the call center 114. The data received by a communication data interface module 112 which processes information and can relay the information to the response console 108 at the control center 114. In addition, the communication data interface module 112 can include logic to store data incoming from the portable computing device 110 in the device database 120. Information stored in the device database 120 comprises portable computing device location information, encoded information, etc. The portable computing device 110 can acquire positioning data from a positioning satellite network 102. In one example, communication data interface module 112 is a centralized server that communicates with one or more response consoles at multiple control centers. Thus, the portable computing device 110 communicates with the communication data interface module 112, which in turn communicates with the appropriate response console 108. In another example, the portable computing device 110 can utilize the positioning data to determine which control center, of a selection of control centers, to call. In another example, the portable computing device 110 can utilize a table of cellular base stations correlated with a particular control center in order to establish which control center to call.

The system illustrated in FIG. 1 can be applied to any system wherein the portable computing device is a nomadic device that depending upon the location of the portable computing device a new call center must be identified. In one example, the call center can be a tourist information center. As the portable computing device travels and changes its location (e.g., from one city to another), the relevant information center may change. Based on a list of tourist information centers stored in the portable computing device and portable computing device positioning information, the portable computing device can identify the responsible or appropriate information center to call. In another example, the call center can be a pharmacy. As the portable computing device travels from one neighborhood to another, the most appropriate pharmacy to call can be identified by the portable computing device.

Figure 2:
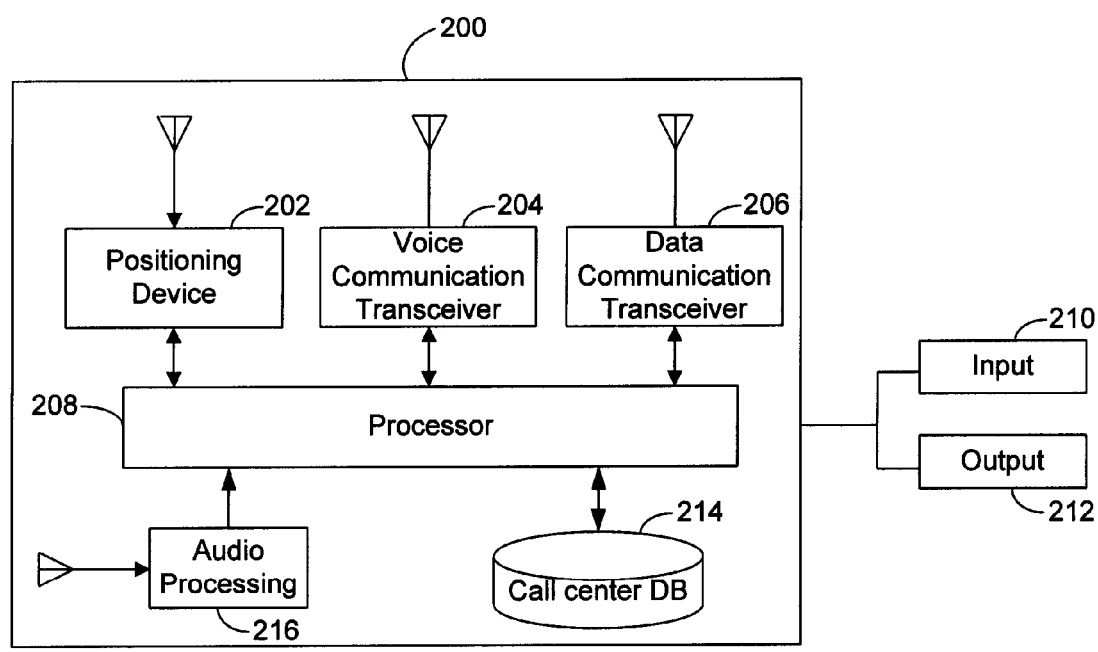
FIG. 2 illustrates a component diagram of a portable computing device configured to determine the appropriate destination number of a control center.

FIG. 2 illustrates a component diagram of a portable computing device configured to determine the appropriate destination number of a control center as illustrated in FIG. 1. A positioning device 202, such as a ground positioning system, can communicate with the satellite network 102 to gather positioning information. Processor 208 coordinates and processes all data transmission requests, calculations, and any operations required by the modules and transceivers in the portable computing device 200.

The voice communication transceiver 204 can include a dialing function or dialer module (not shown) that permits the portable computing device 200 to make voice calls to the call center 108. The voice communication transceiver 204 permits the portable computing device 200 to communicate through the voice network 104. As such, the voice communication transceiver 204 is equipped with logic and protocol information to exchange digital and analog information with the voice network 104. The data communication transceiver 206 can also permit the portable computing device 200 to exchange data with the data network 106. The data exchanged can be analog or digital. Thus, for example, the data can be in a packet switched protocol.

In one embodiment, the portable computing device 200 can further include user interface modules. In one example, an input module 210 and an output module 212 can be provided. Known interfaces for input and output can be provided to interact with the user.

Finally, the portable computing device 200 can also be provided with a call center database 214. The call center database 214 can include a listing of all call centers, calling information of the call centers, and correlated location of each of the call centers. In one example, the call center database 214 includes call center numbers and assigned geographical areas of service. In another example, the call center database 213 includes call center numbers and cellular base station identifiers. In yet another example, where the call centers are public safety answering points that answer emergency calls, the call center database 214 includes a list of numbers corresponding to all the public safety answering points, and the geographical zone being serviced by each public safety answering point. Further, in another example, the call center database 214 may include a public safety answering point calling information and related cellular base stations serviced.

Figure 3:
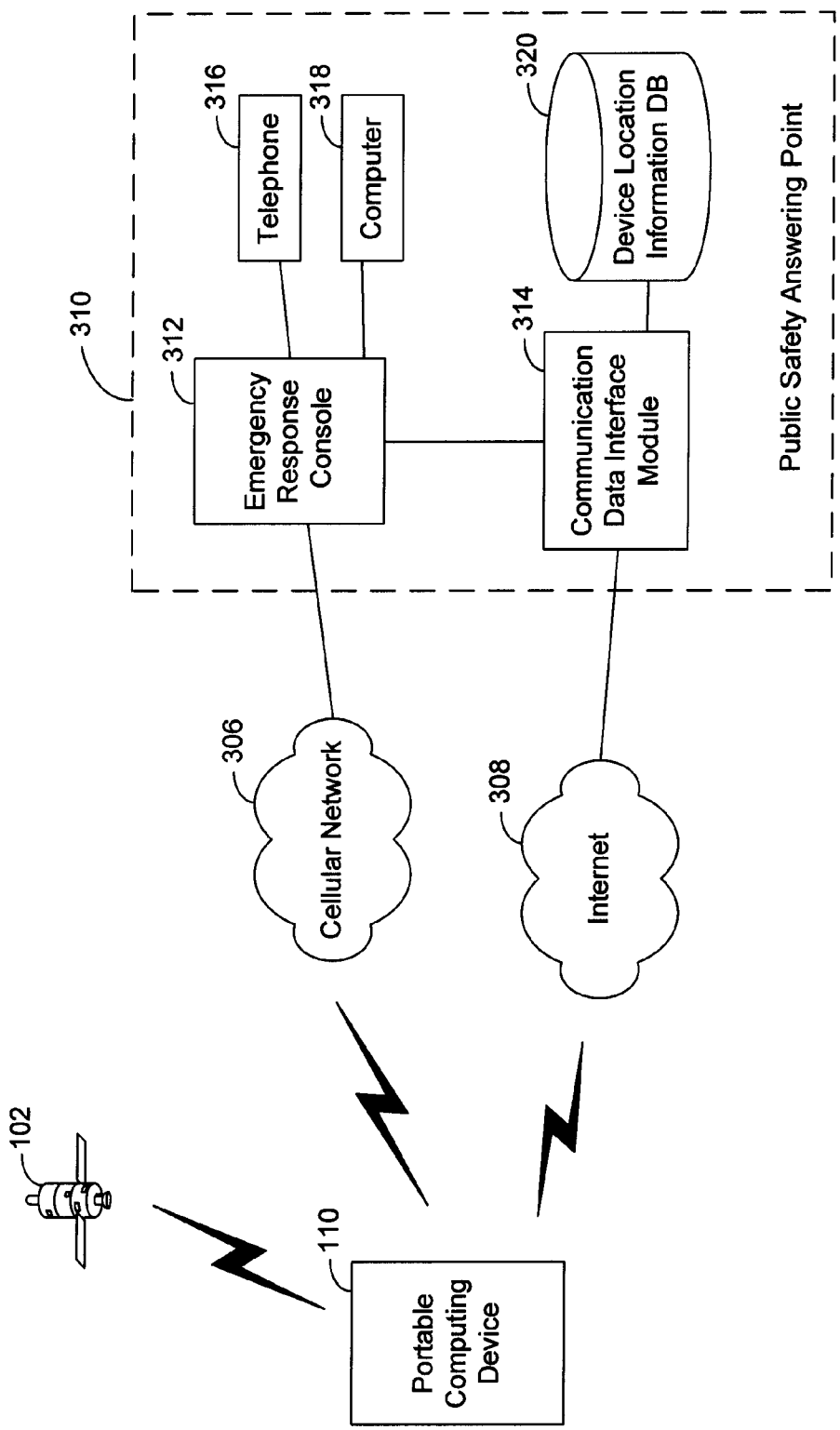
FIG. 3 illustrates a system for communication between a portable computing device and a control public safety answering point.

FIG. 3 illustrates a system for communication between a portable computing device and a control public safety answering point. The portable computing device 110 can be used by a user that needs to make an emergency call (e.g. 911 calls). As a user changes location within a city, a county, a state, or a country, the appropriate emergency call center, or public safety answering point, may also change.

The portable computing device 110 can be located at a remote location from one or more public safety answering points. The portable computing device 110 is capable of making a voice call, transmitting data over a data link, and of determining the portable computing device 110 location using a location receiver. The portable computing device 110 can be any one of a cellular telephone, a personal data assistant (PDA), a smart phone, a laptop, IP phone, etc.

In one embodiment, the portable computing device 110 is configured to use two channels of communication with the public safety answering point. A voice channel can use a voice network to communicate with the public safety answering point. For example, the voice network can be a cellular network 306. The second channel can be a data channel that communicates through a data network, such as, for example, the Internet 308.

In another embodiment, the portable computing device 110 is configured to use one channel to communicate with the public safety answering point. For example, the portable computing device 110 may communicate with the public safety answering point 110 exclusively through the Internet 308. Therefore, the portable computing device 110 can utilize a data channel and a voice channel to communicate with the public safety answering point 310. Both channels can be implemented utilizing the Internet 308. In yet another embodiment, the portable computing device 110 can establish a voice channel and a data channel through the cellular network 306.

The public safety answering point 310 can include a communication data interface module 314 which is a software module on a computer server, or any other computing device. The communication data interface permits the public safety answering point 310 to communicate with the portable computing device 110 through the Internet 308. The communication data interface module 314 can access, retrieve, store, and in general, manage data in the device location information (DLI) database 320. Therefore, the communication data interface module 314 includes logic to receive location position from the portable computing device 110. In addition, the communication data interface module 314 can also provide device location information to an emergency response console 312. Further, the communication data interface module 314 may receive updated location information or other user data, portable computing device 110 data, or other useful information from the emergency response console 312. The communication data interface module 314 can then store such information in the device location information database 320.

The device location information database 320 can reside in a disk file or any other storage medium that is accessible to the communication data interface module 314. In one embodiment, the device location information database 320 has one set of table entries for each portable computing device 110 transmitting data to the public safety answering point 310. The table entry may be created the first time the communication data interface module 314 encounters a data packet sent by the portable computing device 110 or a location data query from the emergency response console 312. A table entry can be uniquely identified by the caller identifier (e.g., the phone number, IP address), and may contain the latest location data set and the latest supplementary data from the portable computing device 110. Other attributes can be updated when a call is received. For example, active call status can be set true when the communication data interface module 314 receives an active call message from the emergency response console 312. Active call status can be set false when the communication data interface module 314 receives a call termination message from the emergency response console 312 component. In one example, the device location information database 320 is formatted according to Table 1.

In one embodiment, the emergency response console 312 handles one or more emergency operators. An emergency operator can utilize a telephone 316 to handle a voice call, and a personal computer 318 to view and handle the incoming and outgoing data related to the emergency call. The emergency response console 312 can therefore be connected to a plurality of telephones, or other voice call interface. In addition, the emergency response console 312 can also be connected to a plurality of personal computer or terminals used by each emergency operator.

In one embodiment, the emergency response console 312 may provide a real time continuous update of the location

TABLE 1

| Data | Data Item Description | Units | Data Type/Size |
|---|---|---|---|
| Address | mobile device caller identification (phone number) | ASCII | string (10 characters) |
| Latitude | position east(+)/west(−) of prime meridian | Degrees | float (5 decimal places) |
| Longitude | position north(+)/south(−) of the equator | Degrees | float (5 decimal places) |
| Altitude | position relative to sea level (above +, below −) | meters | signed integer |
| SOG | speed over ground | meters/sec | unsigned integer |
| COG | course over ground current direction of travel | degrees | unsigned integer |
| GPS time | time of last position in seconds since 1 Jan. 1970 | sec | unsigned long |
| First Name | wireless device supplementary data item | ASCII | string (variable) |
| Last Name | wireless device supplementary data item | ASCII | string (variable) |
| HIPAA 1 | wireless device supplementary data item | number | float (whole number) |
| HIPAA 1 | wireless device supplementary data item | number | float (whole number) |
| Text | wireless device supplementary data item | ASCII | string (50 characters) |
| Call Routing | IP address of last requesting ERC | ASCII | string (variable) |
| Port | port number of last requesting ERC | number | unsigned long |
| Call Active | logic state of call in progress | true/false | boolean (1 bit) |
| Position Data Active | logic state of whether there is location data for this device | true/false | boolean (1 bit) |
| Additional Data Active | logic state of whether there is supplementary data available for this device | true/false | boolean (1 bit) |

The emergency response console 312 can be a software module residing on a standalone server, or an integrated server, and can communicate with the communication interface module 314 in order to exchange update data regarding active calls, etc. In another embodiment, the emergency response console 312 is a computer application that resides at personal computer 318. The emergency repose console 312 can be configured to operably communicate with a modem (not shown) at the personal computer 318 in order to handle the incoming voice call. In another embodiment, the emergency response console 312 resides in a private branch exchange (PBX) (not shown) within the public safety answering point 310.

The emergency response console 312 can be configured to execute various one or more operations. For example, the emergency response console 312 can receive the voice calls from the portable computing device 110, extract caller identifier, extract portable computing device 110 location data received during an emergency call (e.g. using DTMF tones), retrieve associated data from the communication data interface module 314, process emergency calls received by the public safety answering point 310, create a call record, and display the location and caller information on a monitor mapping screen. In another example, the emergency response console 312 can be configured to record and/or report the conversation during the emergency call on tape or digitally. In another example, the emergency response console 312 can be configured to display of the change of location of the portable computing device 110 on a computer display. In yet another example, the emergency response console 312 can be configured to geo-code the location of the portable computing device 110.

mapping of the portable computing device 110 during an emergency call. The emergency response console 312 can receive location updates from the portable computing device 110 via DTMF tones. In another example, emergency response console 312 can receive location updates via data packets.

If the location updates are received as DTMF tones, the emergency response console 312 can be configured with logic to interpret DTMF tones into location information based on a pre-established protocol used by the portable computing device 100 and the emergency response console 312. As such, the emergency response console 312 monitors the voice call for DTMF tones signaling a change in location. The DTMF tones may be deciphered as described below. The location change information may be utilized by the emergency response console 312 component to compute a new location latitude and longitude. Based on the difference in locations and the time difference, the emergency response console 312 component may compute a new speed and course over ground. A location data message may be sent to the communication data interface module 314 for updating the device location information database 320.

In one example, the location interpreted by the emergency response console 312 can be relayed to the personal computer 318 for display. In addition, the emergency response console 312 can provide zoom-in, zoom-out, and labeling functions for use with a location map displayed at an output screen. The output screen can be operably connected to the personal computer 318.

In another embodiment, location data for mapping purposes may be obtained from the communication data interface module 314. In one embodiment, the location data mapping can include a symbol representing the portable computing device 110 placed at the center of the reported location. Further mapping logic can be provided at the emergency response console 312 so that supplementary information regarding each mapped portable computing device 110 can also be provided either on an output screen or via audio. In one example, the mapping logic resides in the emergency response console 312, and the mapping information and supplementary data are transmitted to the personal computer 318 for presentation purposes only. In another embodiment, the emergency response console 312 simply transmits longitude and latitude data, or location data in any other location data format, to the personal computer 318 for processing and mapping.

In yet another embodiment, the emergency response console 312 is configured to create an emergency call record for every voice call received by the emergency response console 312. The emergency call record includes data acquired during the emergency call. In one example, the data format can conform to the format show in Table 2.

TABLE 2

| Data Item | Data Item Description | Units | Data Type/Size |
| --- | --- | --- | --- |
| Caller ID | the phone number of the wireless device | ASCII | string (10 characters) |
| Receive ID | the phone number of the call destination | ASCII | string (10 characters) |
| Receive Time | complete date and time of call reception | YYYYMMDD HHMMSS | Date/Time |
| Answer Time | complete date and time call is answered | YYYYMMDD HHMMSS | Date/Time |
| Disconnect Time | complete date and time call is terminated | YYYYMMDD HHMMSS | Date/Time |

In another embodiment, the emergency response console 312 is also configured to detect an incoming voice call and extract the caller identifier (e.g., phone number) from the call stream. Further, the time at which the emergency call was received can be recorded and reported, along with the identification information, to a real time status panel provided in the personal computer 318. In addition, the emergency call record may be initialized with the caller identification and the time of call receipt.

Furthermore, in one embodiment, the emergency response console 312 may send an active call state message to the communication data interface module 314 for updating the device location information database 320. The communication data interface module 314 can return either a location data packet or a missing data message to the emergency response console (ERC) 312. Subsequently, once the communication data interface module 314 has received the indication of an active emergency call, location data messages can automatically be sent to the emergency response console 312 corresponding to the portable computing device 110 in the emergency call. In addition, once the communication data interface module 314 has received the indication of an active emergency call, supplementary data messages can automatically be sent to the emergency response console 312 corresponding to the portable computing device 110.

Figure 4:
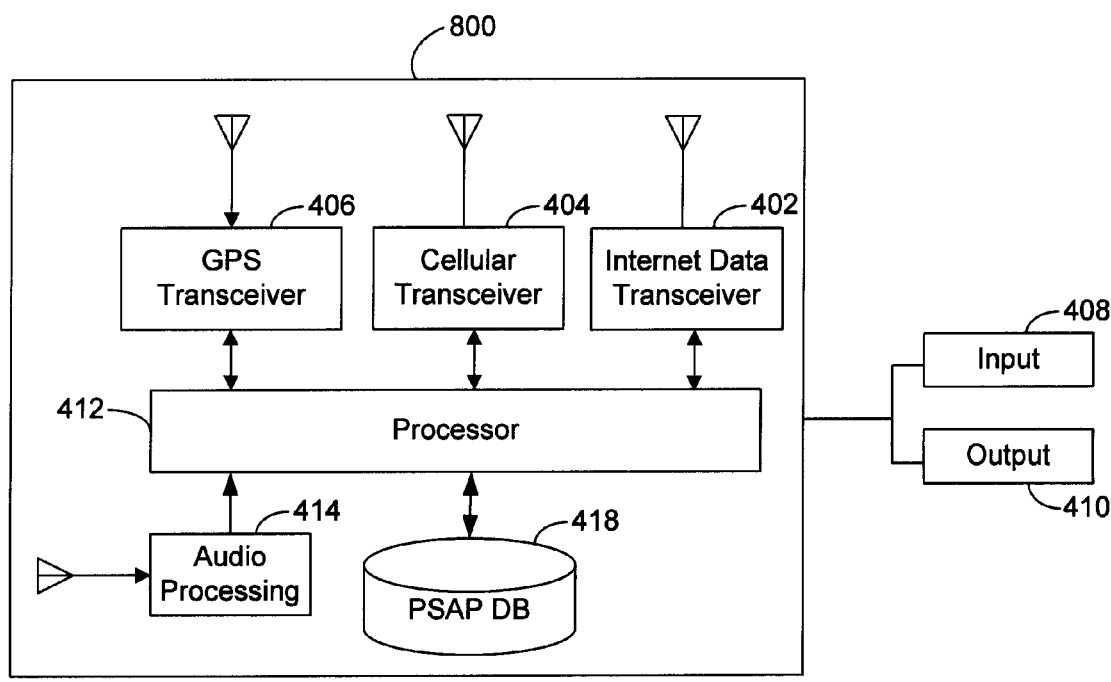
FIG. 4 illustrates a component diagram of a portable computing device configured to determine the appropriate destination number of a public safety answering point.

FIG. 4 illustrates a component diagram of a portable computing device configured to determine the appropriate destination number of a public safety answering point. A portable computing device 400 can be provided for communicating with a public safety answering point. The components and computer logic in the portable computing device 400 can be incorporated into existing portable devices such as cellular telephones and personal data assistants.

The portable computing device 400 can include a ground positioning system received 406 that receives geo-positioning data from a satellite constellation such as satellite network 102. The information received at the ground positioning system can be processed at process 412 and utilized for calculations of new location, public safety answering point determination, etc.

Furthermore, a cellular transceiver 404 can be provided to communicate the portable computing device 400 with a cellular network. The cellular transceiver 404 can be configured for transmitting voice and data over a communications network such as a cellular network. Likewise, an Internet data transceiver 402 can be provided to transmit voice and data over a communications network such as the Internet. In addition, an audio processing module 414 can be provided to receive audio (e.g., voice) for processing and transmission over a data channel or a voice channel. Additional input and output modules can be provided and attached to the portable computing device 400. For example, an input module 408 such as a keyboard can be coupled with the portable computing device 400. In another example, an output module 410, such as a screen or speakers can be coupled with the portable computing device 400.

The portable computing device 400 can also include a public safety answering point database 418. In one example, the public safety answering point database 418 can store records of all available public safety answering points in the United States. In one example, the public safety answering point database 418 can store records of all available public safety answering points in Canada or Mexico, or any other foreign jurisdiction. In another example, the public safety answering point database 418 can store records of local available public safety answering points within a local area such as a state or county.

Figure 5A:
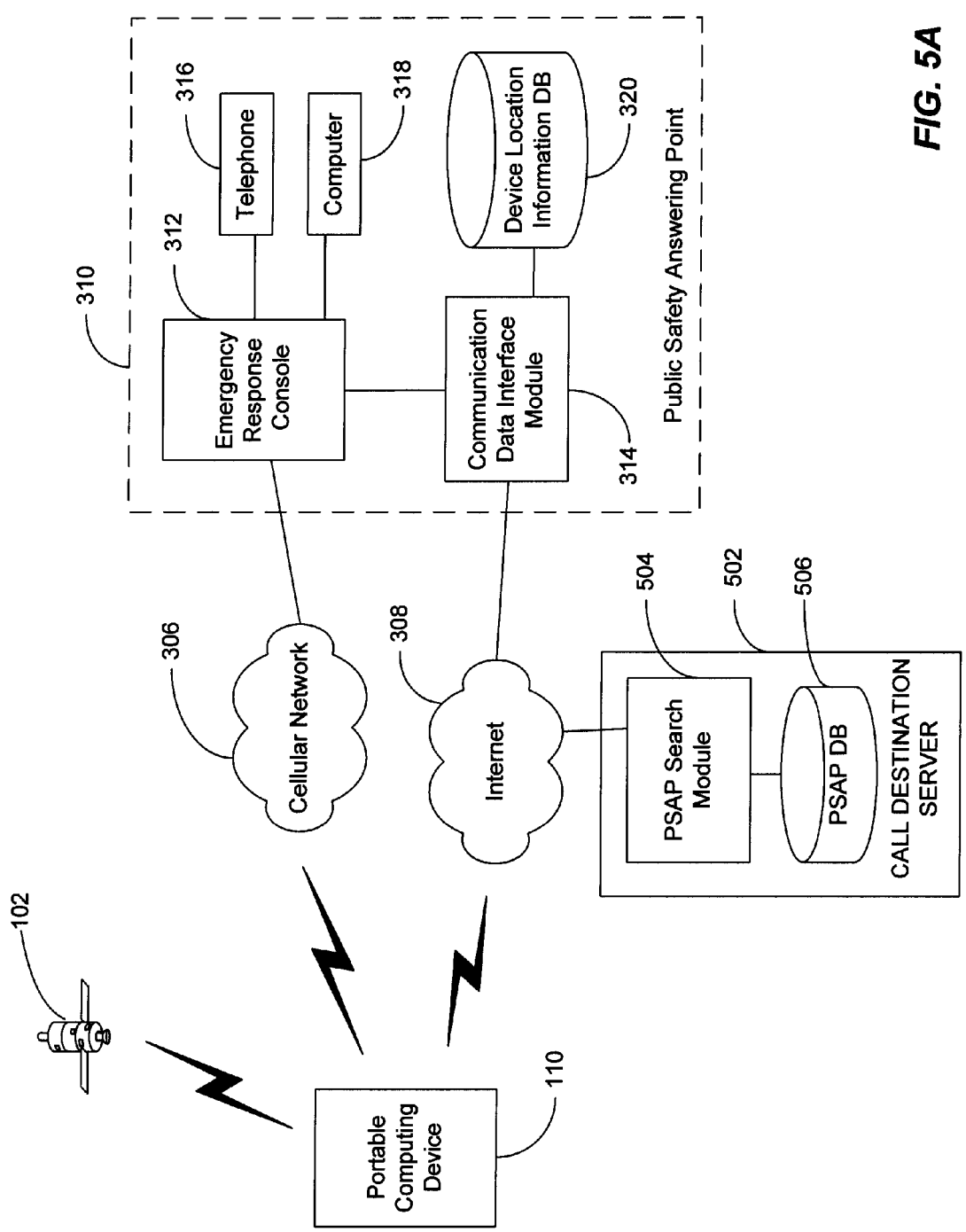
FIG. 5A illustrates a system for communication between a portable computing device and a control public safety answering point, wherein the portable computing device acquires a public safety answering point emergency number from a network server.

FIG. 5A illustrates a system for communication between a portable computing device and a control public safety answering point, wherein the portable computing device acquires a public safety answering point emergency number from a network server. As previously discussed, the portable computing device 110 may include a public safety answering point database. In another example, the portable computing device 110 may not include a public safety answering point database. The portable computing device 110 can make a direct voice emergency call, or telephone call to the responsible public safety answering point by first inquiring to a call destination server 506 regarding the correct public safety answering point to call. In one embodiment, the portable computing device 110 communicates with the call destination server 502 through the Internet.

The destination server 506 can include a public safety answering point search module 504 and a public safety answering point database 506. In one embodiment, a plurality of destination servers can be provided to serve portable computing devices requests. The requests by the portable computing devices can be randomly assigned to one of the plurality of destination servers. In another example, the requests by the portable computing device can be assigned based on load of the destination servers.

The data provided by the portable computing device 110 to the call destination server 502 can depend on the configuration and the pre-established protocol of operation between the public safety answering point and the call destination server 502. In one example, the portable computing device 110 may provide the current location of the portable computing device 110 to the call destination server 502. The call destination server 502 can then determine, based on the location of the portable computing device 110, the communication point (e.g., cellular base station or tower) closest to the portable computing device 110 and further determine the public safety answering point responsible to serve portable computing devices connected to that communication point. In another example, the portable computing device 110 can provide the communication point (e.g., tower number, cellular base station) to the call destination server 502. The call destination server 502 can then determine the public safety answering point responsible to serve the portable computing devices connected to that communication point and provide to the portable computing device 110 the public safety answering point number for initiating a voice call.

In another embodiment, the portable computing device 110 provides the geographical position of the portable computing device 110, and the call destination server 502 determines the responsible public safety answering point. The call destination server 502 can be configured with a list of irregular zones that correspond to each service area of a public safety answering point. Therefore, the call destination server 502 can be configured with logic to determine in which geographical zone the portable computing device 110 is located, and further identify the public safety answering point serving the geographical zone in which the portable computing device is located. Once the public safety answering point is identified, the contact data for the public safety answering point (e.g., telephone number, voice call number) can be provided to the portable computing device 110.

In one embodiment, the portable computing device 110 requests the public safety answering point information subject to the location of the portable computing device 110. For example, if the portable computing device 110 is located in an area that is considered or configured as being local to the portable computing device 110, then the portable computing device 110 can lookup a public safety answering point database that includes only the local public safety answering points. On the other hand, if the portable computing device 110 is in an area that is considered foreign to the portable computing device 110, then the portable computing device 110 can query a call destination server 502 for the appropriate public safety answering point to contact in an emergency. Thus, if the user of the portable computing device 110 lives in Los Angeles, Calif., the portable computing device 110 can include a public safety answering point database that includes information about all of the public safety answering points serving Los Angeles, Calif. If the user requests an emergency call, the portable computing device 110 can simply query a public safety answering point database stored in the portable computing device 110, and quickly dial the responsible public safety answering point number. If the same user travels outside of Los Angeles, Calif., the portable computing device 110 can query the call destination server 502 via the Internet 308 regarding the responsible public safety answering point as the portable computing device 110 travels and changes location.

In one example, the geographical region considered local to the portable computing device 110 can be a city, county, state, province or country. In another embodiment, the region can be defined by other parameters, such as service areas, etc. In addition, the geographical region considered foreign to the portable computing device 110 can also be a city, county, state, province or country.

The portable computing device 110 can be configured to query the call destination server 502 every time an emergency call is to be made. In one configuration, the call destination server 502 can be used to provide the telephone number, or contact information, of the public safety answering point to the portable computing device 110. In another configuration, the call destination server 502 queried for the public safety answering point contact information in order to confirm that the public safety answering point calculated by the portable computing device 110 was correct. In another configuration, the portable computing device 110 can continuously communicate with a call destination server as the portable computing device 110 travels, thereby updating the contact list of local public safety answering points. In this configuration, the portable computing device can be constantly updated with a current list of local public safety answering points and quickly look up the appropriate public safety answering points if the user initiates an emergency call. In yet another configuration, portable computing device 110 can store the contact information of all of the public safety answering points available (e.g., all of the public safety answering points in a country).

Figure 5B:
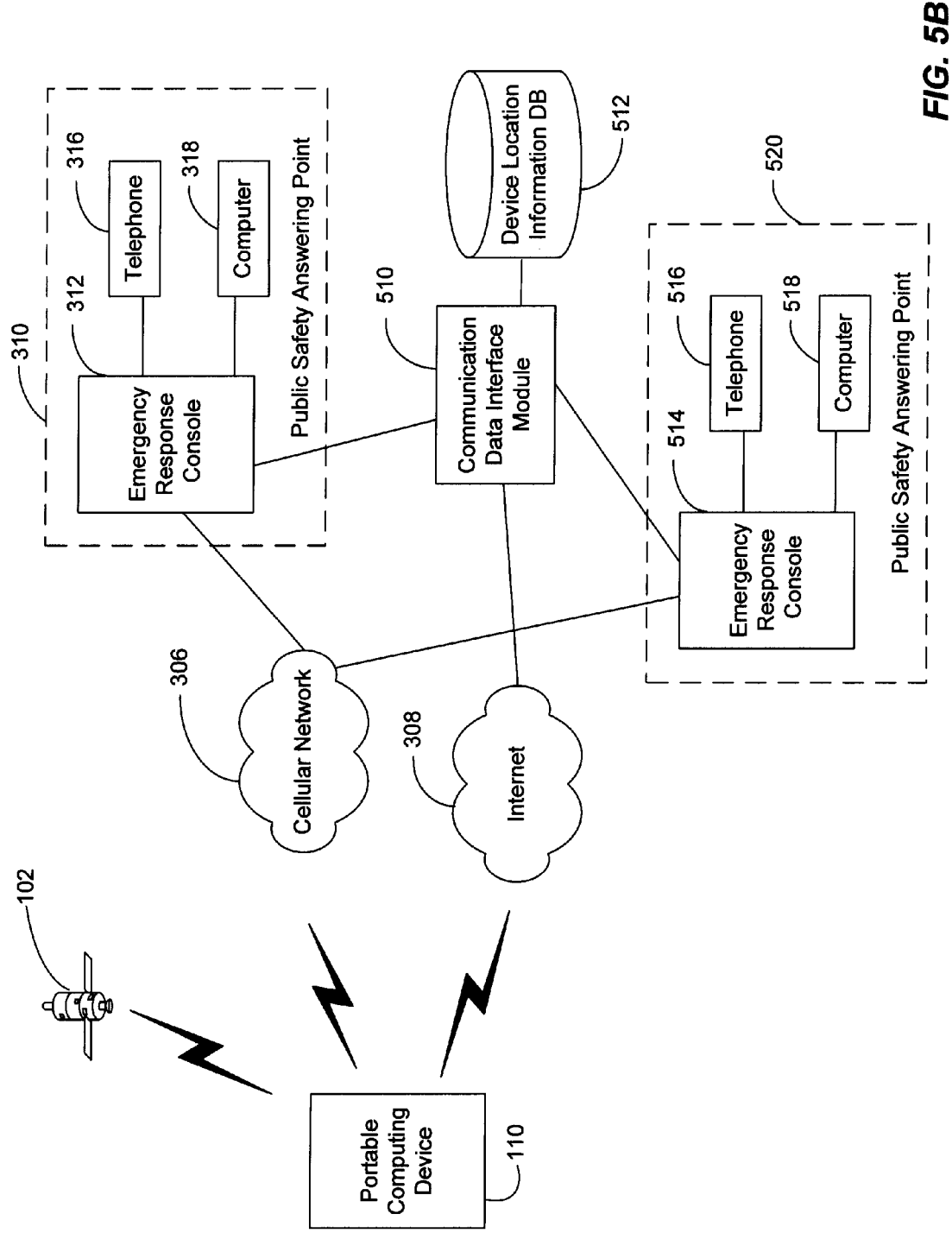
FIG. 5B illustrates a system for communication between a portable computing device and a public safety answering point, wherein one or more public safety answering points communicate with a centralized communication data interface module.

FIG. 5B illustrates a system for communication between a portable computing device and a public safety answering point, wherein one or more public safety answering points communicate with a centralized communication data interface module. Thus, in one embodiment, the communication data interface module is not present in each public safety answering point. Rather, the communication data interface module 510 can be a centralized gateway that receives data from the portable computing device 110, and communicates with multiple public safety answering points The data received from the portable computing device 110 can be automatically transmitted to the emergency response console 312 if a voice call is active between portable computing device 110 and emergency response console 312. On the other hand, the data received from the portable computing device 110 can be automatically transmitted to the emergency response console 514 if a voice call is active between portable computing device 110 and emergency response console 514.

In addition, emergency response console 514 and emergency response console 310 can communicate with the communication data interface module 510 to query position data of a portable computing device, or supplementary data regarding a user in an emergency call. The communication data interface module can then provide location data or other data by querying the device location information database 512.

PSAP Determination Utilizing Base Station Identifiers

Figure 6:
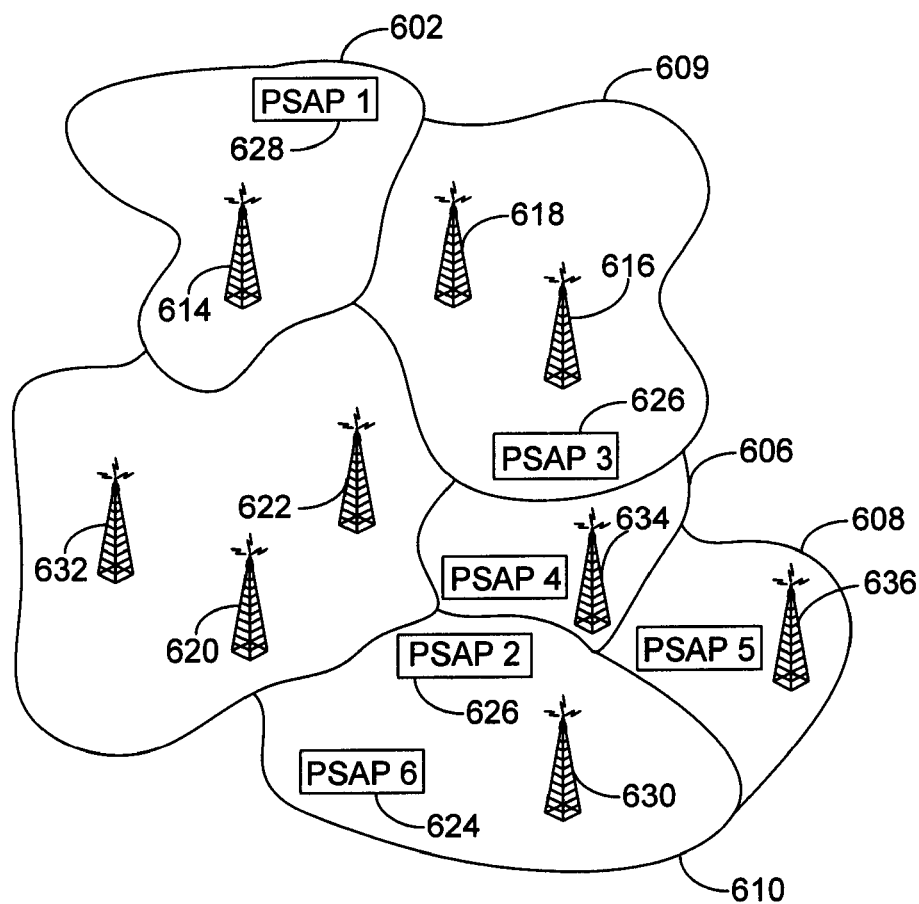
FIG. 6 illustrates cellular base stations pre-assigned to specific public safety answering points.

FIG. 6 illustrates cellular base stations pre-assigned to specific public safety answering points. In one embodiment, each of the areas illustrated is proscribed by the service area of cellular base stations that, in turn, are served by public safety answering points. Other permutations and methods of configuring the areas associated with groups of cellular base stations can also be utilized.

Each of the public safety answering points serves one or more cellular base stations. For example, public safety answering point 628 serves emergency calls incoming from cellular base station 614. Thus, a portable computing device 110 traveling in area 602 is communicated with cellular base station 614. As discussed above, the portable computing device 110 determines that public safety answering point 628 is responsible to handle an emergency call from the portable computing device 110, and thus the portable computing device 110 would directly dial to the public safety answering point 628.

As the portable computing device 110 travels through areas 604, 606, 608, 610 and 612, the communicating cellular base station is determined. Depending on the cellular base station that the portable computing device 110 communicates with, the portable computing device 110 can be configured to make the appropriate emergency call to the public safety answering point responsible for the call. Therefore, public safety answering point 626 is responsible for emergency calls that are connected through cellular base stations 618 and 616. Public safety answering point 624 is responsible for emergency calls that are connected through cellular base station 630. In addition, public safety answering point 626 is responsible for emergency calls that are connected through cellular base stations 632, 622 and 620. Even when public safety answering point 626 may not be physically located closest to cellular base stations 632, 622 and 620, or in area 612, public safety answering point 626 can be assigned to be responsible for cellular base stations 632, 622 and 620.

Figure 7:
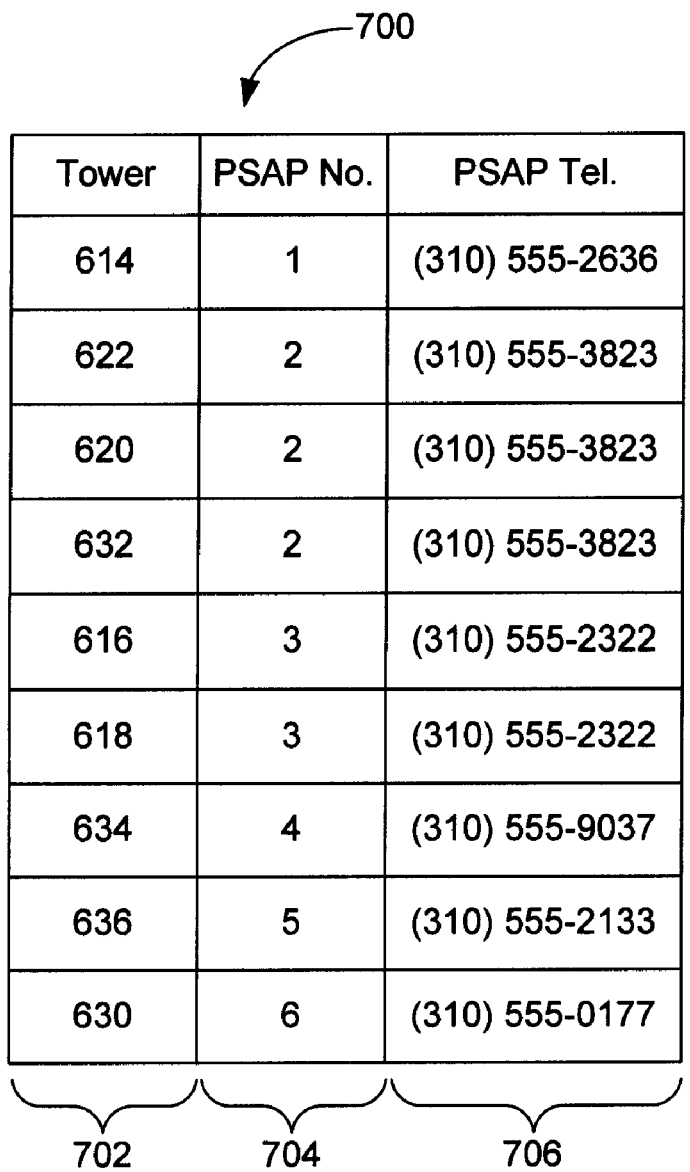
FIG. 7 illustrates a table of cellular base station identifiers and corresponding public safety answering point identifiers.

FIG. 7 illustrates a table 700 of cellular base station identifiers and corresponding public safety answering point identifiers. The table 700 can include a tower column 702 that lists cellular base station identifiers. As previously mentioned, if another type of communications network is utilized instead of a cellular network, other communication points maybe utilized instead of cellular base stations.

Each of the cellular base station identifiers listed under tower column 702 has a corresponding public safety answering point that is responsible for handling emergency calls from portable computing devices that are connected to the cellular network through a cellular base station. For example, cellular base station 614 has a corresponding responsible public safety answering point number one. The public safety answering point identifier can be provided in a public safety answering point identifier column 704 of the table 700. The public safety answering point identifier for the public safety answering point responsible for calls associate with cellular base station 614 is public safety answering point one. Therefore, an emergency call from a portable computing device that communicates with the cellular network through cellular base station 614 should be handled by public safety answering point one. Thus, once the portable computing device establishes that cellular base station 614 is the cellular base station with which the portable computing device is communicating, the portable computing device can execute a look-up operation in table 700. The look-up operation in table 700 will yield that public safety answering point one is responsible for handling the calls being routed thought cellular base station 614. In addition, a direct telephone number for public safety answering point one can be identified (e.g., 310-555-2636). The portable computing device can the make a direct dialed emergency call to public safety answering point one.

In another embodiment, where the look-up table resides at a server, such as call destination server 502, the lookup of the appropriate public safety answering point can be performed at the server. The telephone number for the public safety answering point responsible to handle the call can be provided to the portable computing device so that the portable computing device can make the emergency call directly to the responsible public safety answering point.

The table 700 can be part of a relational database, a data file, etc. In one embodiment, the table 700 resides in a database local to the portable computing device 110, such as public safety answering point database 418. In another embodiment, the table 700 resides in a database remote from the portable computing device 110 at a server, such as the public safety answering point database 506.

Figure 8:
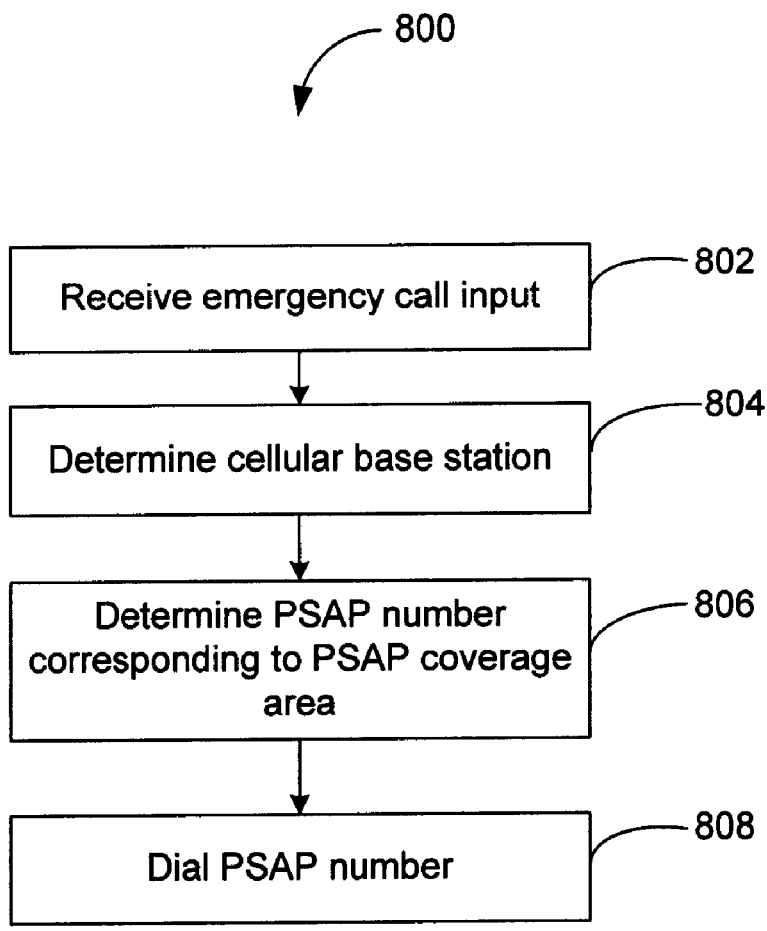
FIG. 8 illustrates a data flow diagram for a process of determining the appropriate public safety answering point in an emergency call.

FIG. 8 illustrates a data flow diagram for a process 800 of determining the appropriate public safety answering point in an emergency call. At process block 802, an emergency call input is received at the portable computing device 110. The emergency call input can be for example the dialing of 911 at the portable computing device 110. In another embodiment, the emergency call input can be the input of an emergency button provided at the portable computing device 110. Process 800 then continues to process block 804.

At process block 804, the cellular base station with which the portable computing device 110 is determined. In another example, a communication point with which the portable computing device 110 can also be determined. As such, the portable computing device 110 can communicate through communications such as WiFi nodes in HotSpots, Bluetooth connection points, wireless USB, etc. Process 800 then continues to process block 806.

At process block 806, the public safety answering point voice call number is determined. The public safety answering point voice call number can be determined by executing a look-up of the public safety answering point database (e.g., lookup table) and identifying the contact number of the public safety answering point that serves emergency calls corresponding to the cellular base station (or communication point) being utilized by the portable computing device 110. The contact number can be any number that permits a voice call connection to be established. The contact number can be, for example, a telephone number. In another example, the contact number can be an Internet address. In another example, the contact number can be a computer network address. Process 800 then continues to process block 808. At process block 808, the public safety answering point contact number is dialed.

PSAP Determination Utilizing Zone Identifiers

Figure 9:
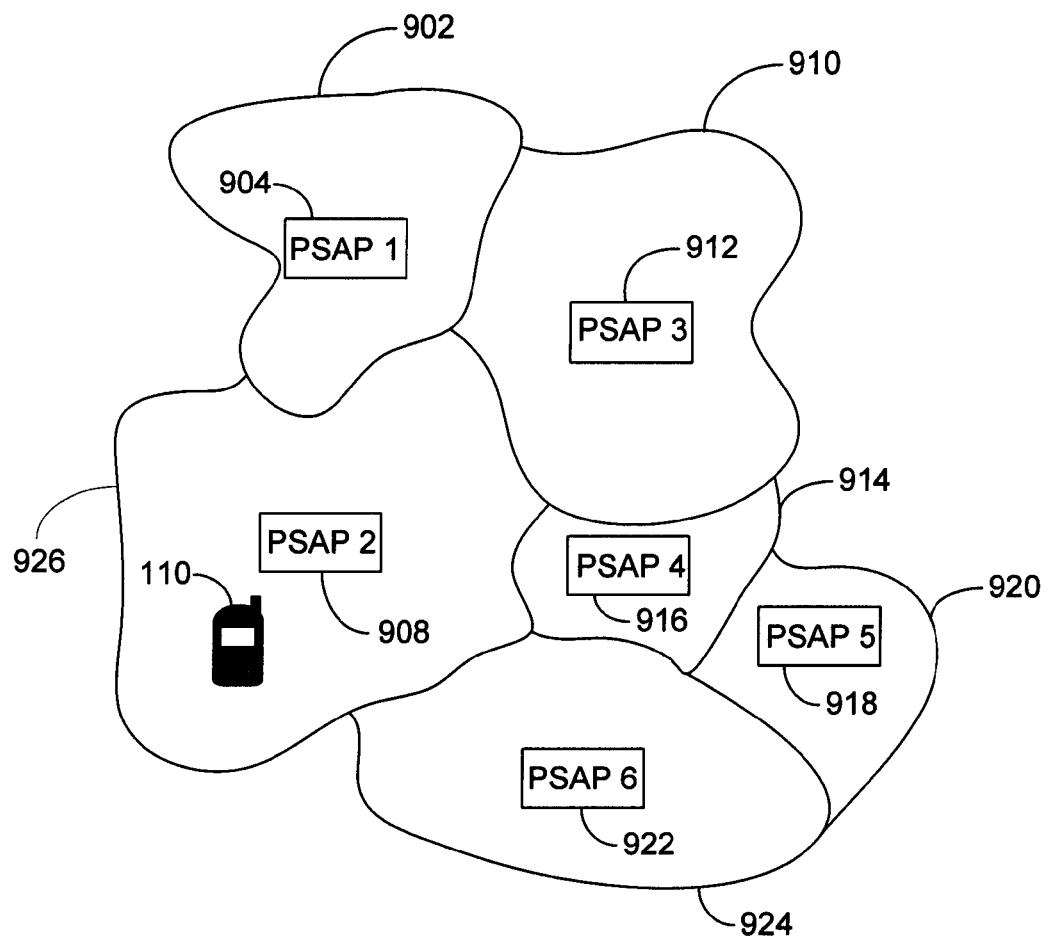
FIG. 9 illustrates geographical area assigned to specific public safety answering points.

FIG. 9 illustrates geographical area assigned to specific public safety answering points. As the portable computing device 110 travels through multiple geographical areas, the appropriate public safety answering point will vary. In one embodiment, the area served by each public safety answering points is defined by a geographical irregular boundary. In one example, the geographical irregular boundary can be stored in the portable computing device 110 along with a correlation between the irregular boundary and the public safety answering point identifier. In another example, the geographical irregular boundary can be stored at a server along with a correlation of the geographical irregular boundary and the public safety answering point.

Therefore, depending on the location of the portable computing device 110, the portable computing device 110 can be configured to make the appropriate emergency call to the public safety answering point responsible for the call. The portable computing device 110 can utilize the position data obtained from the positioning device included therein (e.g., ground positioning system device). Utilizing the position information, the portable computing device 110 can determine the geographical zone in which the portable computing device 110 is located. This determination can be performed by methods described below. Furthermore, the local public safety answering point can be searched in the public safety answering point database 418 or at the public safety answering point database 506 discussed above, in order to identify the public safety answering point that corresponds to the geographical zone in which the portable computing device is located. The portable computing device 110 may then use the public safety answering point contact information retrieved from the public safety answering point database to initiate an emergency call.

For example, if the portable computing device 110 is located in geographical zone 926, the portable computing device can determine that the portable computing device's 110 position is within the boundaries of geographical zone 926. Then, by performing a search in the public safety answering point database, public safety answering point 908 can be identified as the responsible public safety answering point for geographical zone 926. Again, the contact information for public safety answering point 908 can then be identified and the portable computing device initiates an emergency voice call to the public safety answering point 908.

Figure 10A:
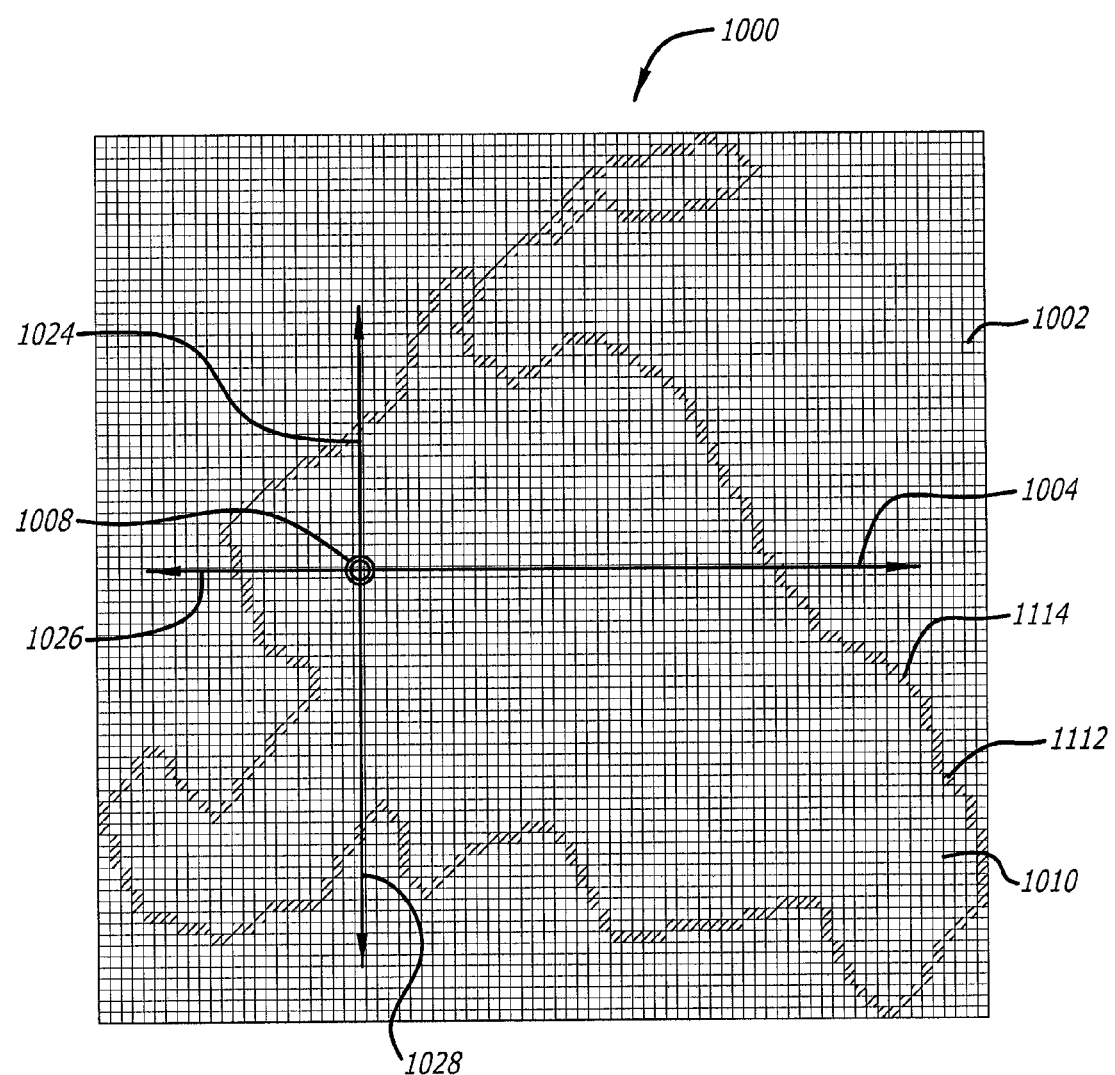
FIGS. 10A-10B illustrate a pixilated image representing a geographical zone assigned to the public safety answering point.

FIG. 10A illustrates a pixilated image 1000 representing a geographical zone assigned to the public safety answering point. Public safety answering points can be defined by geofences that delineate the service area of each public safety answering point. In one embodiment, the portable computing device 110 can store a plurality of geographical zones corresponding to the zones served by each public safety answering point. The geographical zones can be stored as a collection of location points, as pixilated image, etc. In another embodiment, a remote server stores the plurality of geographical zones corresponding to each geographical zone served by each public safety answering point.

The pixilated image 1000 illustrates an image that can be stored as part of representing the zone of service of a public safety answering point. The zones of service can be configured in a client computer with a graphical user interface. Deflection points can represent the boundaries of the geographical zone.

In one embodiment, after all the deflection points for a given zone are uploaded to a portable computing device 110, or to a server, the pixilated image 1000 is saved in a memory module of the portable computing device 110, such as public safety answering point database 418. The pixilated image 1000 can be stored as a pixel map. The pixilated image 1000 is created by first drawing a square around the entire area of the zone. The square can be divided into an 80/80-pixel map, or any other combination. Each pixel 1002 is a geographical square, meaning that each pixel 1002 can represent a geographical squared zone of a pre-established area. The pixels can be used to draw the outline shape 1112.

A position fix 1008 in the pixilated image 1000 is mapped from the current geographical location of the portable computing device 110. A test can be performed to for each public safety answering point zone for each position fix 1008 in order to determine if the location of the portable computing device 110 is in pixilated image 1000 or outside of the pixilated image 1000. If the current position fix 1008 falls inside the pixilated image 1000, a more extensive test is completed by plotting the position fix 1008 inside the pixilated image 1000 and drawing four lines in four directions (north, south, east and west) from the position fix 1008 to the borders of the delineated zone 1010. Subsequently, the number of zone boundary crossings 1004 is counted for each of the four lines 1022, 1024, 1026, and 1028.

Multiple boundary crossing tests are performed for accuracy. If any of the four lines 1022, 1024, 1026, and 1028 cross an odd number of zone boundaries 1112, the position fix 1008 is considered inside the zone 1010. If any of the four lines 1022, 1024, 1026, and 1028 crosses an even number of zone boundaries, the position fix 1008 is considered outside the zone 515. If at least three out of the four boundary crossing tests agree, the zone boundary crossings 1004 are used to determine if the position fix 1008 is inside or outside the zone 1010. If three out of the four boundary tests do not agree, the position fix 1008 is considered outside the zone 1010.

In one embodiment, the portable computing device 110 can be configured with event logic that determines that a preconfigured event occurred when the portable computing device 110 enters or leaves a defined geographical zone. For example, upon entering a zone, the portable computing device 110 may be configured to indicate the name of the new zone by either displaying on an integrated screen or by emitting a sound or prerecording indicating that a new public safety answering point is now in service. In another example, another event may occur when the portable computing device 110 leaves a zone. For example, the portable computing device 110 can be configured to compute whether the entered zone is in a new time zone, and if so, indicate the new time zone and the current time.

In another embodiment, an irregular zone or geographical zone may be defined by one or more waypoints. Waypoints are defined by a location point and a radius, therefore forming a circular region. The geographical zones corresponding to service area of each public safety answering point can be defined using one or more waypoints.

Figure 10B:
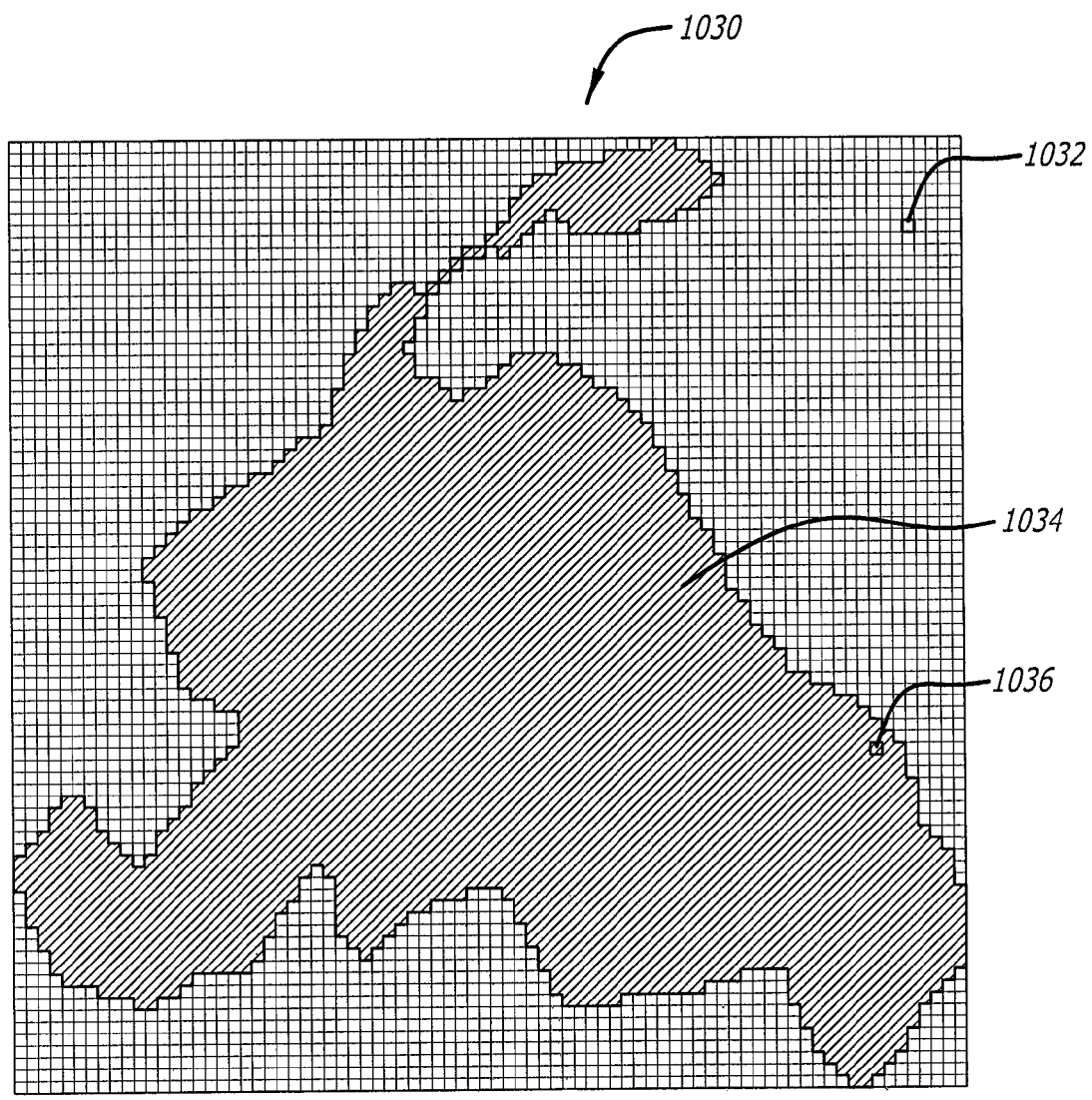

FIG. 10B illustrates a pixilated image 1030 representing a geographical zone assigned to the public safety answering point. The pixilated image 1030 may be configured to include active or "on" pixels, and inactive or "off" pixels. In one embodiment, a pixel 1036 can be darker in color than a pixel 1032. In another embodiment, pixel 1036 simply has an associated flag indicating that pixel 1036 has an active state. In addition, pixel 1032 can have an associated flag indicating that pixel 1032 has an inactive state.

The pixilated image 1030 can be built such that active pixels correspond to the geographical area being covered, such as the public safety answering point service area 1034. The inactive pixels can be utilized so that the area represented by the inactive pixels is outside the boundaries of the public safety answering point service area 1034. Each pixel can correspond to a square geographical area. Thus, when the portable computing device 110 receives positioning data, the portable computing device 110 can quickly calculate the pixel corresponding to the position of the portable computing device. Subsequently, the portable computing device 110 can also calculate whether the pixel corresponding to the position of the portable computing device 110 is active or inactive, thereby determining whether the portable computing device 110 is inside or outside the public safety answering point service area 1034.

Figure 11:
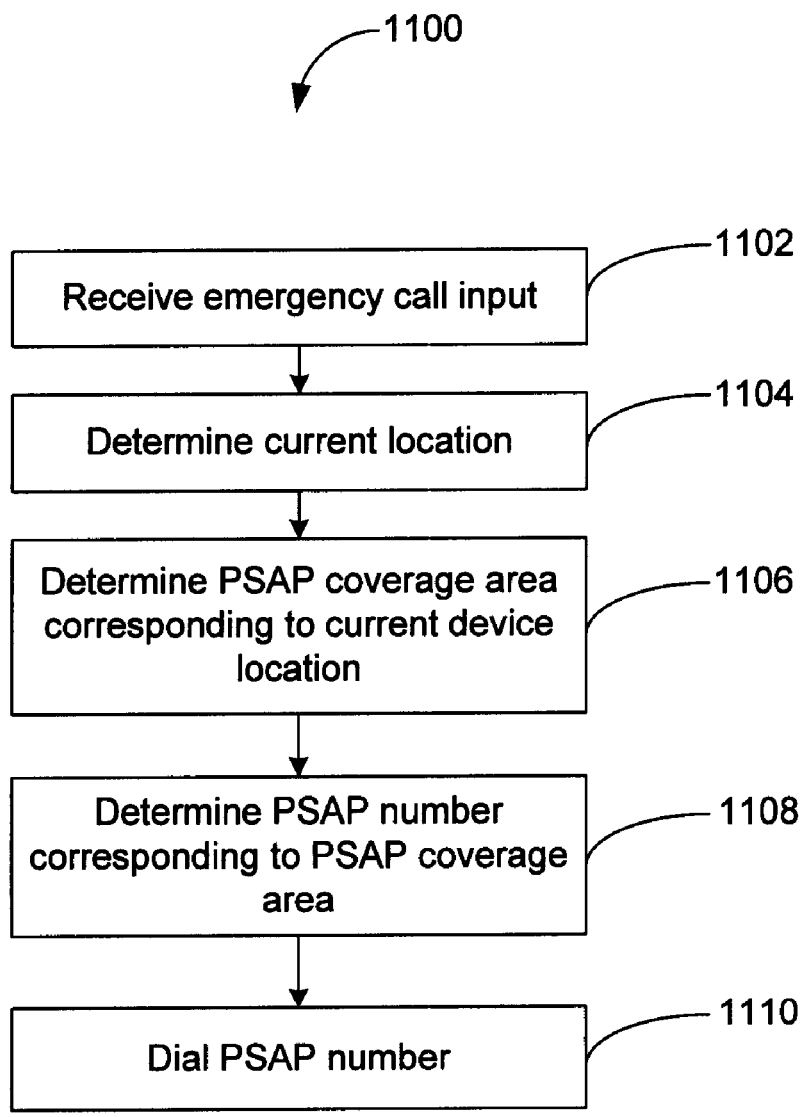
FIG. 11 illustrates a data flow diagram for a process of determining, based on pre-configured geographical areas, the appropriate public safety answering point in an emergency call.

FIG. 11 illustrates a data flow diagram for a process 1100 of determining, based on pre-configured geographical areas, the appropriate public safety answering point in an emergency call. At process block 1102, an emergency call input is received at the portable computing device 110. In one example, the emergency call input is the user dialing a 911 number. Process 1100 then continues to process block 1104.

At process block 1104, the current location is determined. The location of the portable computing device 110 is determined by receiving positioning data from a positioning device. The geo-location of the portable computing device 110 can also be determined. Process 1100 then continues to process block 1106.

At process block 1106, the public safety answering point coverage area corresponding to the current location is determined. As previously described, the area of public safety answering point service in which the portable computing device 110 is located is determined. The area of public safety answering point service is determined utilizing the location of the portable computing device 110 and determining the public safety answering point area in which the portable computing device 110 is located. Process 1100 then continues to process block 1108.

At process block 1108, the public safety answering point voice call number is determined. The public safety answering point voice call number can be determined by executing a look-up of the public safety answering point database (e.g., lookup table) and identifying the telephone number or contact number corresponding to the public safety answering point identified as servicing the public safety answering point area in which the portable computing device is located. Process 1100 then continues to process block 1110. At process block 1110, the public safety answering point voice call number is dialed directly to the public safety answering point.

User Profile Configuration

Figure 12:
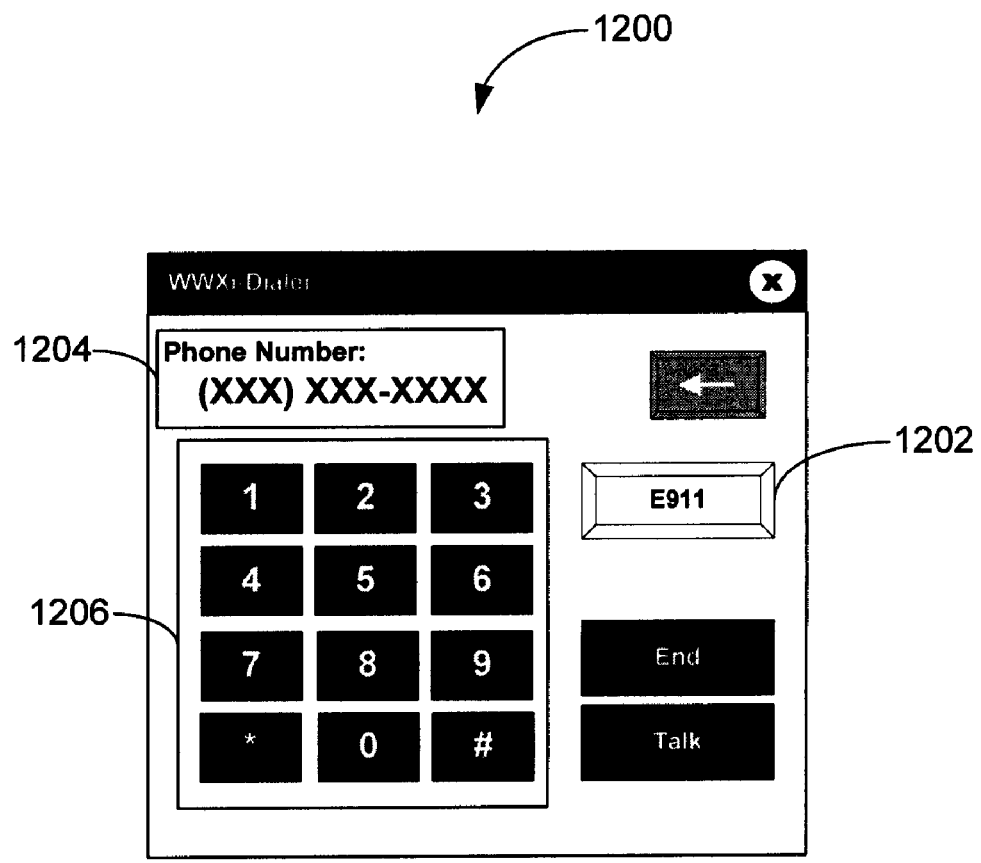
FIG. 12 illustrates a screenshot of a user interface for dialing to a public safety answering point.

FIG. 12 illustrates a screenshot of a user interface for dialing to a public safety answering point. A user interface 1200 can be provided through the portable computing device 110 (e.g., screen or display). A menu structure can be provided as part of allowable operations by the user. The user interface may provide the means to initiate a voice call to the public safety answering point. In one embodiment, an emergency button 1202 is provided to make a one-touch call. The emergency button 1202 can be configured with a speed-dial operation in order to call a 911 number. Initiation of the emergency call may include dialing the appropriate phone number and signaling the operations application to perform the voice call sequence. As previously discussed, the voice call sequence may comprise identifying the appropriate public safety answering point to call. Thus, upon identifying the correct public safety answering point to contact, the portable computing device 110 can display the telephone number 1204 of the public safety answering point for dialing. In case the user is disconnected from the emergency call, the user can quickly redial the previously called public safety answering point number using a keypad 1206. Alternatively, the user may simply press the emergency button 1202 again.

In anther embodiment, the first time the use requests an emergency call, the user can do so by entering a 9-1-1 combination on the keypad 1206. In yet another embodiment, the user may dial any emergency number that corresponds to emergency services in the specific jurisdiction (e.g., a European country).

Figure 13:
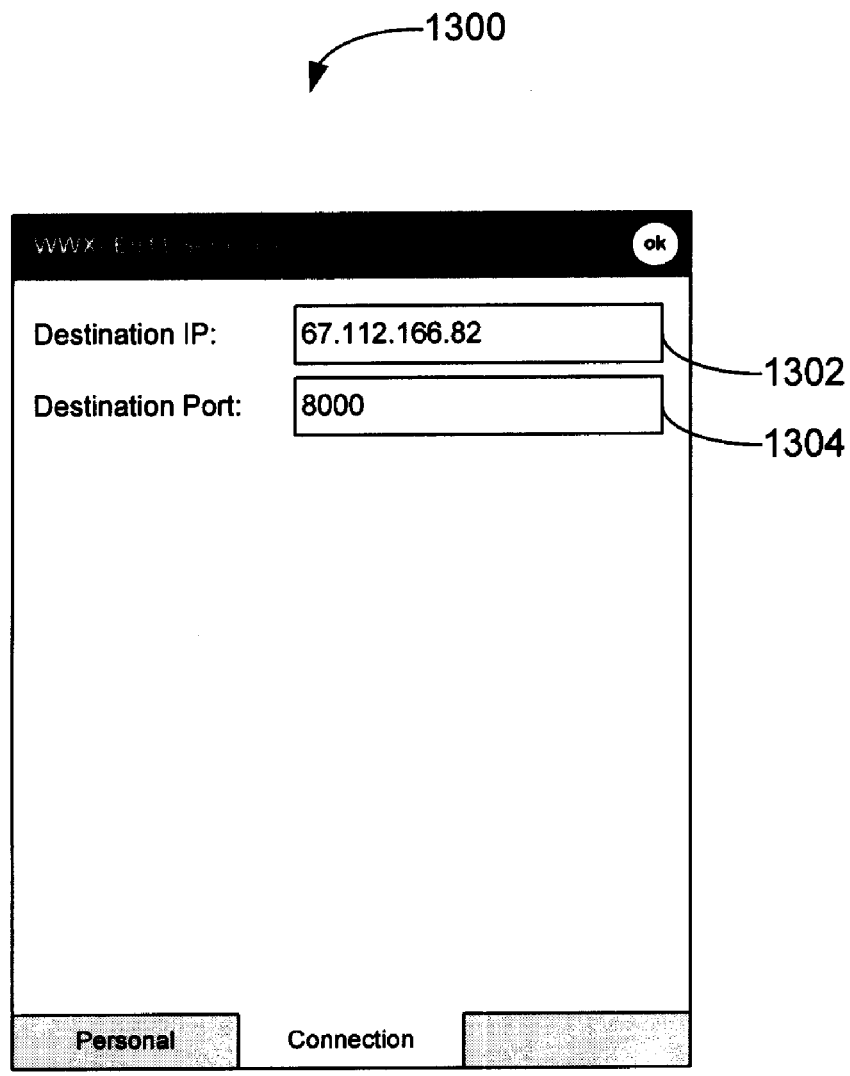
FIG. 13 illustrates a screenshot of a user interface for entering communication data.

FIG. 13 illustrates a screenshot of a user interface for entering communication data. A user interface 1300 can be provided through the portable computing device 110 (e.g., screen or display). A menu structure can be provided as part of allowable operations by the user. As part of connectivity configuration, a destination address field 1302 and a destination port field 1304 can be provided for a user to configure the data connection for transmitting information data packets to the public safety answering point or call center.

In one embodiment, the destination address defaulted to the communication data interface module 314 of the local public safety answering point based on the user's home address. In another embodiment, the destination address the communication data interface module 314 is dynamically allocated as the portable computing device 110 connects to a data network, such as the Internet. For example, the destination address can be provided by a server in response to the portable computing device 110 sending location data. Based on the location of the portable computing device 110, the destination address can be populated. In another embodiment, the destination address can be provided by requesting the correct address from a domain name server.

Furthermore, if the communication data interface module 314 is a centralized server, the address can be a public domain address that resolved at a process, such as a domain name service, in the communication data interface module 314.

Figure 14:
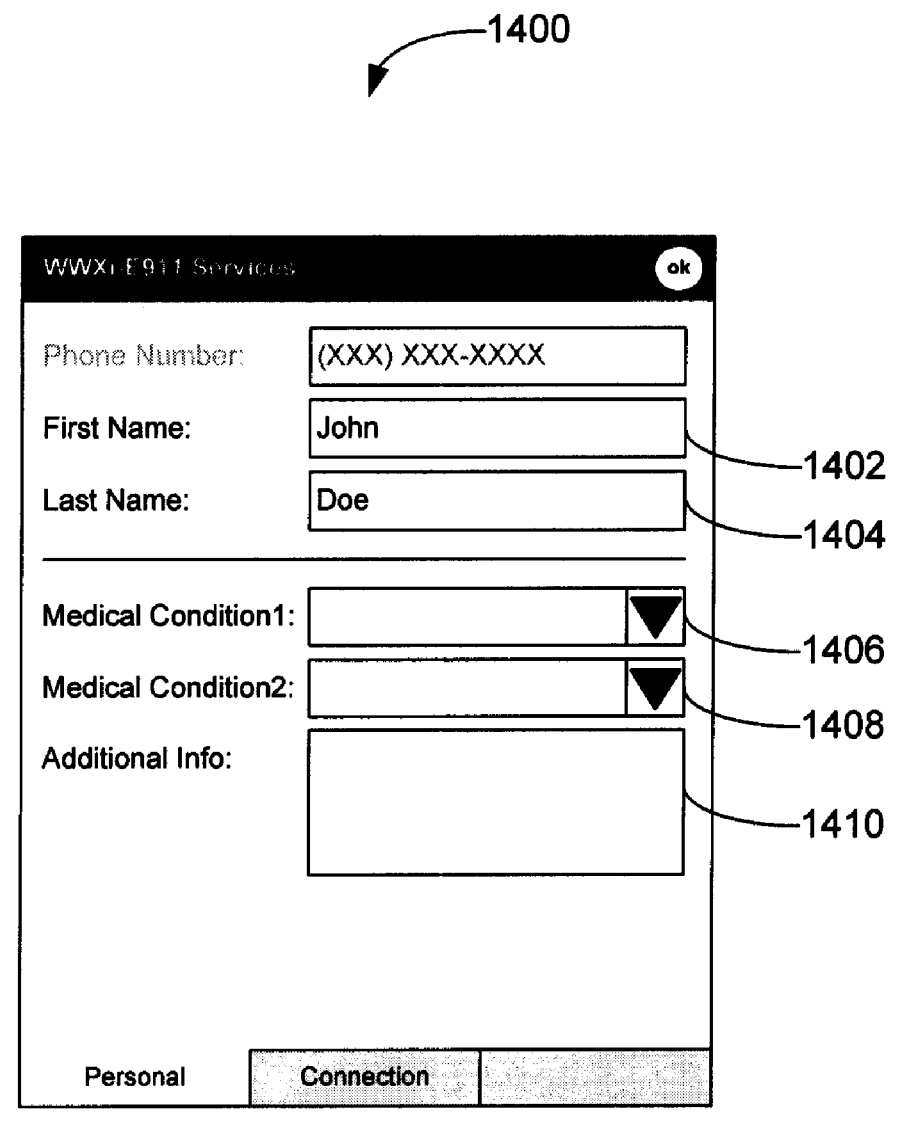

FIG. 14 illustrates a screenshot of a user interface 1400 for customizing user information to be reported to the public safety answering point. A user interface 1400 can be provided through the portable computing device 110 (e.g., screen or display). A menu structure can be provided as part of allowable operations by the user. The user interface 1400 may provide means to configure a personal profile of the user of the portable computing device 110. In one example, the first name and the last name can be entered through user interface 1400. A first name field 1402 and a last name field 1404 can be provided. In another example, a medical condition field 1406, and a second medical condition field 1408 can further be provided. The medical condition fields permit a user to enter existing medical conditions that an emergency operator should know while handling the call. For example, the emergency operator may dispatch necessary personnel to assist the user in case of an emergency. In another embodiment, medical condition codes may be established.

In yet another embodiment, a textbox field 1410 can be provided to enter any information regarding the user that might be useful or necessary for the operator to assist in an emergency. In another embodiment, the information entered can be immediate family telephone numbers, personal identifiers, blood type, DNA information, etc. In another embodiment, codes utilized as medical condition can be the Health Insurance and Portability Accountability Act (HIPAA) codes. Once the user enters the information When the user depresses an action button (e.g., 911) in the portable computing device 110, the portable computing device 110 may extract the user profile and transmit the data over a data channel to the communication data interface module 314. The data can be provided as "supplementary" to the identifier of the portable computing device 110 (e.g., the telephone number). A supplementary data packet may include all of the information from the personal profile stored in the portable computing device 110.

Location Transmission and Updating

Figure 15:
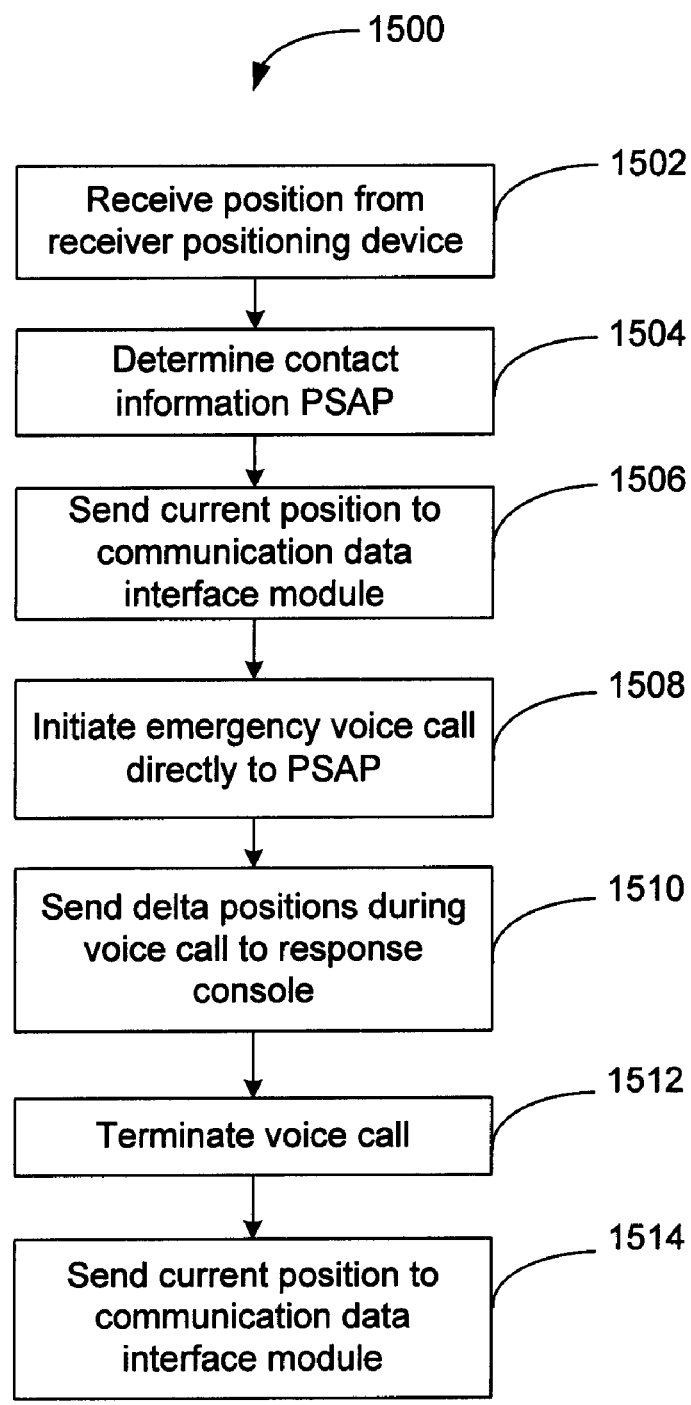
FIG. 15 illustrates a flow diagram for a process of performing an emergency call to a public safety answering point.

FIG. 15 illustrates a flow diagram for a process 1500 of performing an emergency call to a public safety answering point. At process block 1502, the position is received from the positioning device. The process 1500 then continues to process block 1504. At process block 1504, determine public safety answering point contact information. The public safety answering point contact information can be determined utilizing any one of the methods discussed above, or any other methods know. In one example, the public safety answering point is determined based on the cellular base station in communication with the portable computing device 110. In another example, the public safety answering point is determined based on the zone of service of the public safety answering point. The process 1500 then continues to process block 1506.

At process block 1506, the current position is transmitted to the communication data interface module. The process 1500 then continues to process block 1508.

At process block 1508, the emergency voice call is made to the appropriate public safety answering point. The public safety answering point number utilized to make the emergency voice call. The process 1500 then continues to process block 1510.

At process block 1510, the position data are sent during the voice call. The position data can be sent utilizing DTMF tones. One or more DTMF tones can be sent in order to transmit latitude or longitude change or deltas of the portable computing device 110. In one embodiment, the DTMF tones are transmitted over the voice network. In another embodiment, the DTMF tones are transmitted over a data network, such as the Internet. Furthermore, the position data can be transmitted using a data link. The process 1500 then continues to process block 1512.

At process block 1512, the emergency voice call is terminated. Once the user has received the necessary information or emergency assistance, the user may terminate the emergency call. The process 1500 then continues to process block 1514. At process block 1514, the current position of the portable computing device 110 is sent to the communication data interface module in order to update the last position of the portable computing device 110 immediately after termination of the emergency voice call.

Figure 16:
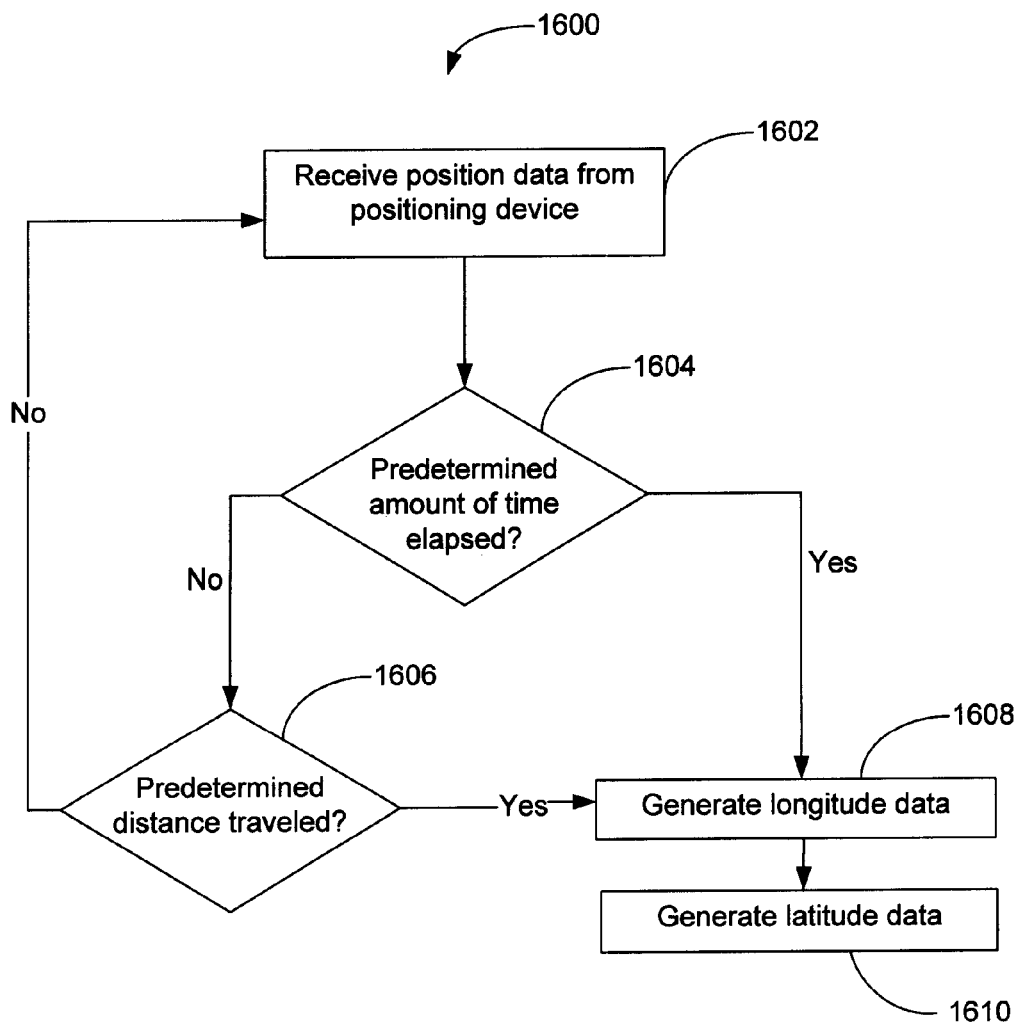
FIG. 16 illustrates a flow diagram for a process of updating location data.

FIG. 16 illustrates a flow diagram for a process of updating location data. At process block 1602, the position is received from the positioning device. As mentioned previously, a position device utilized by the portable computing device 110 that provides coordinates or other positioning information can be utilized. For example, a ground positioning system device can be utilized. In another example, a device that receives position based any other system of triangulation, guidance, or navigation is utilized. The process 1600 then continues to process block 1604.

At process block 1604, it is determined whether a predetermined amount of time has elapsed. A predetermined amount of time can be, for example, be an amount of time such as ten seconds. In one embodiment, the user can configure the amount of time in the portable computing device 110. In another embodiment, the manufacturer of the portable computing device 110 configures the portable computing device 110 with a "hard-coded" amount of time. In yet another embodiment, the predetermined amount of time can be dynamically updated when a message is received from an operator at a public safety answering point. The predetermined amount of time can be made shorter if the frequency of reporting should be increased. The predetermined amount of time can be made longer if the frequency is to be decreased. In one example, the predetermined amount of time can be configured to be zero. If a predetermined amount of time has elapsed, then the process 1600 then continues to process block 1608. If a predetermined amount of time has not elapsed, the process 1600 then continues to process block 1606.

At process block 1606, it is determined whether a predetermined distance has been traveled by the portable computing device 110. The predetermined distance of travel can be configured such that only significant changes of location are reported, such as for example, one-hundred meters. In one embodiment, the user can configure the predetermined distance of travel in the portable computing device 110. In another embodiment, the manufacturer of the portable computing device 110 configures the portable computing device 110 with a "hard-coded" predetermined distance of travel. In yet another embodiment, the predetermined distance of travel can be dynamically updated when a message is received from an operator at a public safety answering point. In one example, the predetermined distance of travel can be configured to be zero. If a predetermined distance has been traveled by the portable computing device 110, then the process 1600 then continues to process block 1608. If a predetermined distance has not been traveled by the portable computing device 110, then process 1600 then continues to process block 1602.

At process block 1608, longitude position data is generated. For example, DTMF tones indicative of a longitude delta can be generated. The DTMF tones are generated based on a protocol indicated below. DTMF tones are universally used in portable computing device such as cellular phones, personal data assistants (PDAs), smart-phones, etc. Therefore, using DTMF tones to convey information of location change is easily used. In addition, DTMF tones can be submitted from the portable computing device 110 utilizing the same voice link that is being utilized for the emergency voice call. It is not necessary to utilize a secondary voice channel or data channel. In another embodiment, the DTMF tones can be sent through a separate voice channel. In yet another embodiment, the DTMF tones can be sent though a data channel. In another embodiment, DTMF tones can be transmitted to the public safety answering point via the same data channel that the voice emergency call is being transmitted (via a voice-over-IP methodology).

In another example, longitude position data can be incorporated in data packets being transmitted over a communications network. Furthermore, additional data such as altitude, temperature, etc., can also be generated and transmitted in the same or additional data packets.

The process 1600 then continues to process block 1610. At process block 1610, latitude position data is generated. For example, DTMF tones indicative of a latitude delta are generated. The DTMF tones can be generated utilizing the methodology described below, or any other methodology. The change of latitude of the portable computing device 110 can be transmitted utilizing DTMF tones.

Latitude position data can also be incorporated in data packets being transmitted over the network. Furthermore, additional data such as altitude, temperature, etc., can also be generated and transmitted in the same or additional data packets.

Figure 17:
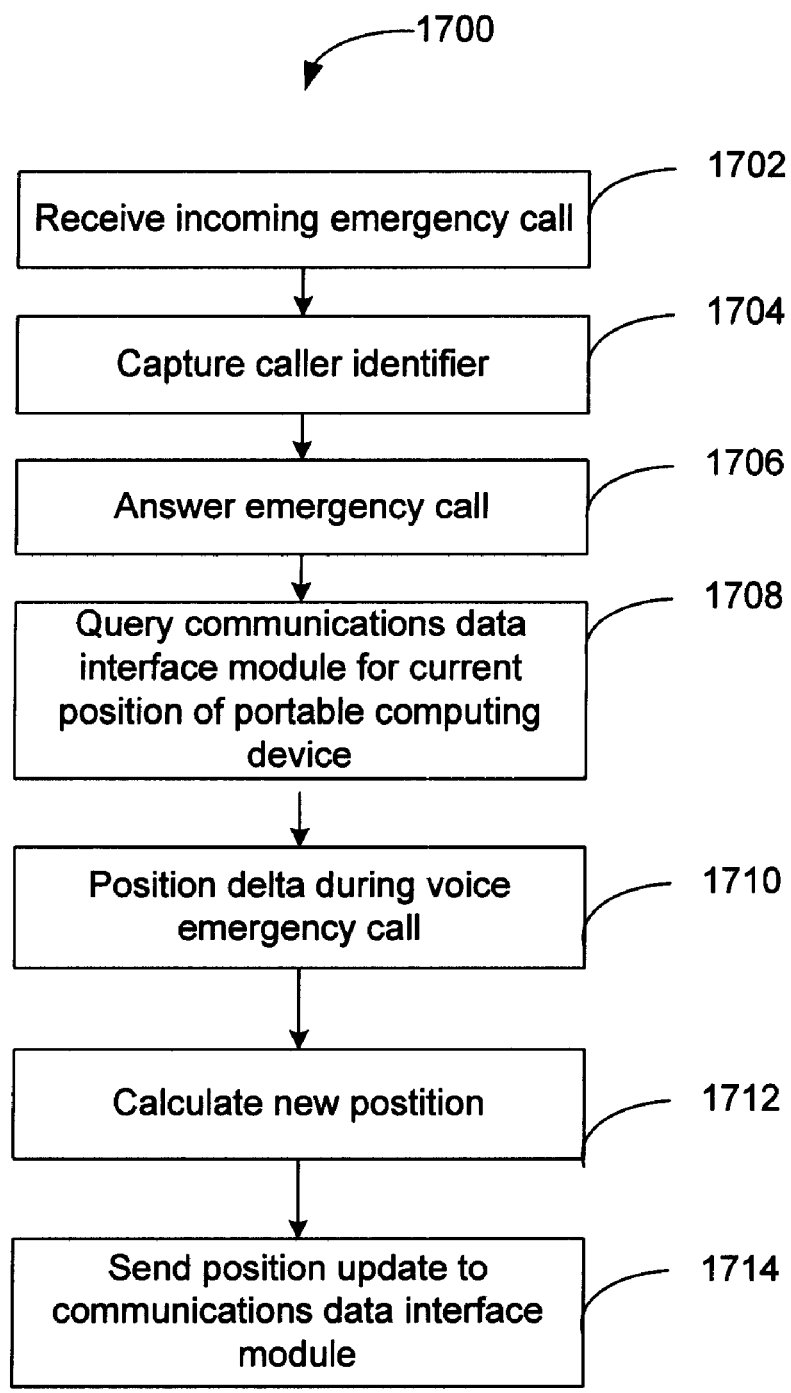
FIG. 17 illustrates a flow diagram for a process of receiving an emergency call at a public safety answering point.

FIG. 17 illustrates a flow diagram for a process 1700 of receiving an emergency call at a public safety answering point. At process block 1702, an emergency incoming call is received by the public safety answering point. The call can be received at the emergency response console. Process 1700 then continues to process block 1704.

At process block 1704, the caller identifier is captured. In one embodiment, the caller identifier comprises the automatic number identification (ANI). In another embodiment, the caller identifier comprises an Internet address. Process 1700 then continues to process block 1706. At process block 1706, the emergency call is answered. In one example, the emergency operator has access to a user interface of the emergency response console, and utilizes the emergency response console to handle the emergency call. In another embodiment, the emergency response console can route the call to one of the public safety answering point operators in for call handling. In yet another embodiment, a first emergency operator utilizes the emergency response console to route the call to another emergency operator.

Upon receipt of the call by the emergency response console, the emergency response console can transmit a message to the communication data interface module indicating the network address of the emergency response console during the emergency call. The communication data interface module can then utilize the provided address to communicate with the emergency response console. Process 1700 then continues to process block 1708.

At process block 1708, the communications data interface module is queried for current position of the portable computing device. In one embodiment, the emergency response console does not receive DTMF tones unless the portable computing device 110 changes position. Therefore, the location position can be provided to the communication data interface at the beginning of the call. The communication data interface can then record the initial position of the portable computing device 110 at the device location information database. Upon request by the emergency response console, the communication data interface module can query the device location information database in order to provide the last known location of the portable computing device 110. Process 1700 then continues to process block 1710.

At process block 1710, the position deltas are received during the emergency voice call. In one embodiment, the position deltas are received in the form of DTMF tomes at the emergency response center. In another embodiment, position deltas or new positions are received at the communication data interface module, which in turn, records that new position at the device location information database. If an emergency call is active between the portable computing device and the emergency response console, the communication data interface can automatically forward the position data to the emergency response console. Moreover, the communication data interface can automatically forward the position data to another emergency service terminal such as a computer in a patrol vehicle, a fire station operations center, etc. In addition, the device location information can be stored in the form of position deltas, or as a recalculated position. For example, each device can have a history of position deltas. Every time the device location information database is queried for the position of a portable computing device, a history of deltas is provided which not only provides the current location, but also the path of the portable computing device during the emergency call. In another example, only the recalculated position is stored in the device location information database is utilized. Process 1700 then continues to process block 1712.

At process block 1712, the new position of the portable computing device is calculated. In one embodiment, after the emergency response console has received the position deltas, or changes in position from the portable computing device 110, the emergency response console can then calculate the new position of the portable computing device based on the deltas. Further, map the new position of the portable computing device on the terminal of the emergency operator. In another embodiment, the emergency response console sends the position deltas to the communication data interface module for calculation of the new position. After the new position is recalculated, the communication data interface module transmits the new position to the emergency response console. Process 1700 then continues to process block 1714.

At process block 1714, the position update is transmitted to the communications data interface module. If the emergency response console recalculates the new position, then the emergency response console transmits the new position to the communications data interface module so that the new position can be recorded at the device location information database. Process 1700 then continues to process block 1716.

Figure 18A:
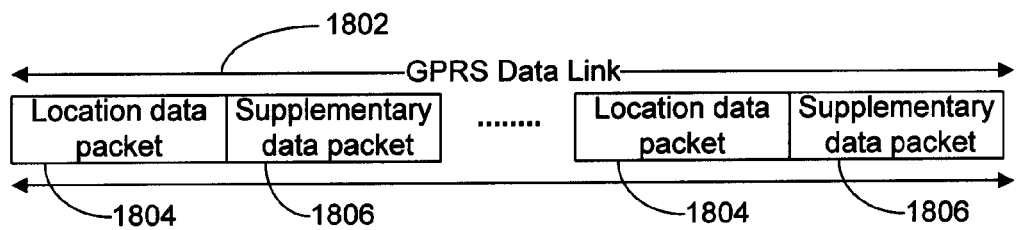
FIGS. 18A-18C illustrate data packet and voice transmissions during an emergency call at a public safety answering point.
Figure 18B:
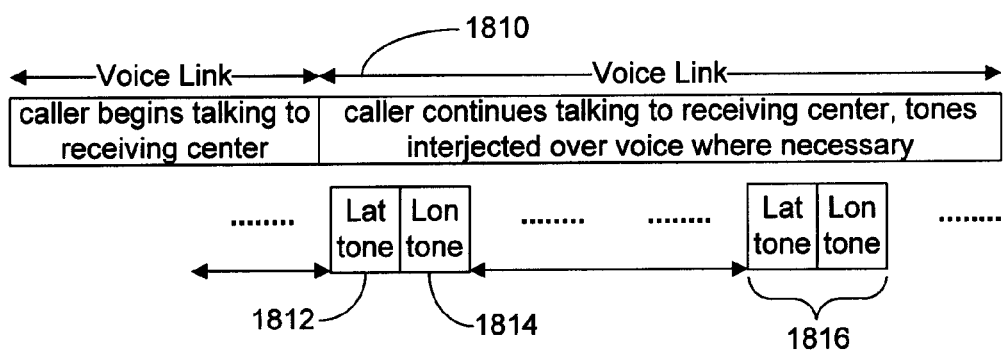
Figure 18C:
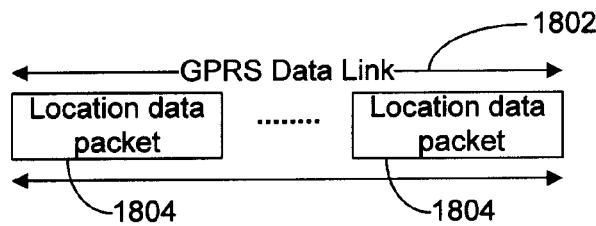

FIGS. 18A-18C illustrate data packet and voice transmissions during an emergency call at a public safety answering point. In one embodiment, two channels of communication can be employed. A general packet radio service (GPRS) data link 1802 and a voice link 1810. Any data communication configuration of transmitting data can be utilized, such as IP protocol, UDP protocol, SMS protocol, HTTP, TCP/IP, or other common data carriers. FIG. 18A illustrates exemplary data packets that can be sent by the portable computing device 110 over the general packet radio service data link 1802 as soon as a call is initiated. In one embodiment, a location data packet 1804 can be transmitted. The location data packet 1804 can include complete position information such as latitude and longitude. In addition, if the location data packet 1804 being transmitted is sent to update the location data packet 1804, the location data packet 1804 can include the position changes in latitude and longitude. In another example, a supplementary data packet 1806 can be transmitted. The supplementary data packet 1806 can include personal profile data for the user of the portable computing device 110.

FIG. 18B illustrates the voice link of communication between the portable computing device 110 and the public safety answering point. Once the portable computing device 110 establishes a voice link 1810 to the public safety answering point, the user can convey his or her emergency needs. In one embodiment, during the conversation, information may be sent over the voice link 1810. In one embodiment, during the conversation, information may be sent over the data link. The information sent may include any data that the portable computing device 110 wants to transmit to the emergency response console, and that the emergency response console knows how to interpret. In one example, the information sent is a DTMF latitude longitude tone package. The DTMF latitude longitude tone package may include a latitude tone 1812, and a longitude tone 1814. In a further embodiment, the DTMF tones are compressed so as to cause minimal interruption of the emergency call. In another embodiment, the DTMF tones are included in data packets transmitted over a data network.

FIG. 18C illustrates further data packets being transmitted over a data communications network at the end of the emergency call. In one embodiment, a location data packet 1804 can be further submitted from the portable computing device 110 to the public safety answering point as soon as the emergency call is terminated. In one example, the location data packet can be received at the communications data interface module.

Figure 19:
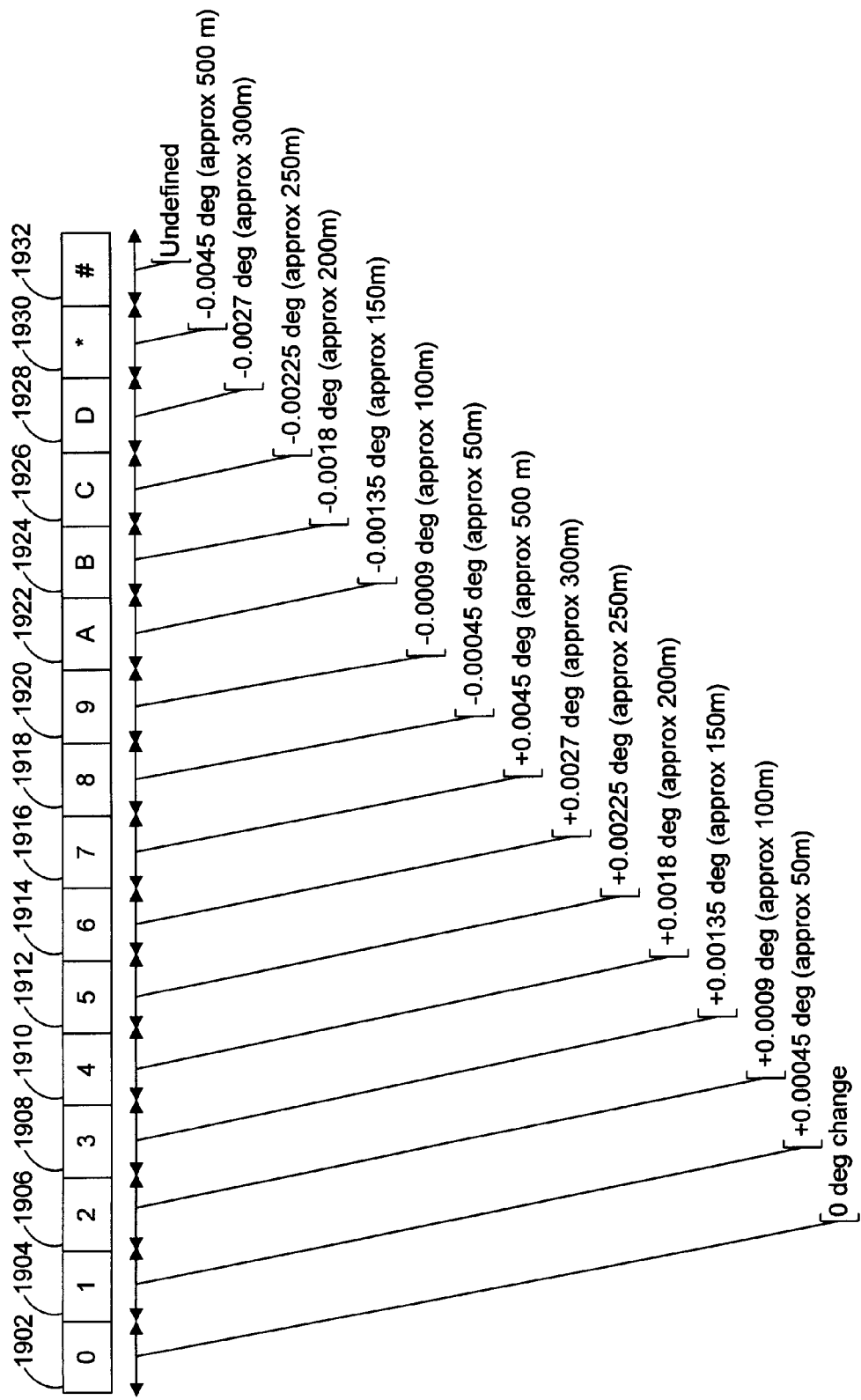
FIG. 19 illustrates an exemplary mapping of DTMF tones to ranges of movement in latitude or longitude.

FIG. 19 illustrates illustrate an exemplary mapping of DTMF tones to ranges of movement in latitude or longitude. A communication protocol can be established for transmitting DTMF tones from a portable computing device to the public safety answering point or call center, in order to report a location update. The DTMF tones can be utilized, for example, using a telephone network. In another example, the DTMF tones can be transmitted through a data network. In a standard environment, there are sixteen standard DTMF tones. In an exemplary embodiment, each of the sixteen DTMF tones (i.e., 0-9, #, *, A, B, C, D) can be mapped to different ranges of movement of the portable computing device. Other tones can also be established and customized so as to represent further information (e.g., altitude, speed, etc.).

In one embodiment, a tone packet may consist of two tones. In addition, tone packets may be transmitted only if some conditions occur. In one example, tone packets may be transmitted only if the latitude or longitude change is greater than twenty-five meters. In another example, tone packets may be transmitted only if the mobile device has transitioned to stop. In yet another example, tone packets may be transmitted at least every ten seconds.

Each tone packet may include two tones. Each of the tones in the tone packet may be any one of tones 1902 to 1932. Each tone can be assigned a degree of change as part of a pre-established protocol. In one example, tone 1902, "0", would represent a zero degree change. In another example, tone 1904, "1", represents a 0.00045-degree change, or approximately fifty meters.

In one embodiment, the new latitude is calculated according to the following formula: new latitude=initial latitude+ latitude change corresponding to tone received.

In another embodiment, the new longitude is calculated according to the following formula: new longitude=initial longitude+(longitude change corresponding to tone received/ cos (initial longitude)). It should be understood, that other formulas and ranges assigned to each DTMF tone could be utilized.

Therefore, the DTMF tones are mapped to a specific range of movement that is associated to each of the particular DTMF tones. However, in one embodiment, the specific range or location information being mapped to each tone is independent of the frequency or digit representation of each tone. In another embodiment, only eight DTMF tones are utilized. In yet another embodiment, less than sixteen DTMF tones are utilized.

Although certain illustrative embodiments and methods have been disclosed herein, it will be apparent from the foregoing disclosure to those skilled in the art that variations and modifications of such embodiments and methods may be made without departing from the true spirit and scope of the art disclosed. Many other examples of the art disclosed exist, each differing from others in matters of detail only. For instance, various combinations of communication networks may be utilized. In addition, an emergency voice call, as well as any voice communications, can be performed over a packet switched network, or any data network in general (e.g. utilizing voice-over-IP technology). Accordingly, it is intended that the art disclosed may be limited only to the extent required by the appended claims and the rules and principles of applicable law.

The invention claimed is:

1. A method of making an emergency voice call from a portable computing device, comprising:
    determining with a processor of the portable computing device a location area identifier that represents a geographical area in which the portable computing device is located;
    determining with the processor a coverage area identifier that matches the location area identifier, wherein the coverage area identifier represents an emergency service area being serviced by a public safety answering point;
    identifying with the processor a voice call destination number associated with the coverage area identifier; and
    utilizing with a dialing module of the portable computing device the voice call destination number in order to establish communication with the public safety answering point.

2. The method of claim 1, wherein location area identifier is a pixilated image.

3. The method of claim 1, wherein the geographical area is an irregular area.

4. The method of claim 1, wherein the emergency service area is an irregular area.

5. The method of claim 1, wherein the voice call destination number is a telephone number of the public safety answering point.

6. The method of claim 1, wherein the voice call destination number is an Internet protocol address.

7. The method of claim 1, wherein the coverage area identifier and the location area identifier are correlated in a lookup table.

8. The method of claim 7, wherein the lookup table resides in the portable computing device.

9. The method of claim 7, wherein the lookup table resides in a remote server.

10. The method of claim 1, wherein the coverage area identifier and the voice call destination number are correlated in a lookup table.

11. The method of claim 10, wherein the lookup table resides in the portable computing device.

12. The method of claim 10, wherein the lookup table resides in a remote server.

13. The method of claim 1, further comprising receiving emergency call input to initiate the emergency voice call from a user.

14. The method of claim 1, further comprising automatically initiating the emergency voice call if a preconfigured event occurs.

15. The method of claim 1, further comprising transmitting personal data associated with a user of the portable computing device.

16. The method of claim 15, wherein the personal data includes a medical condition, contact information of a relative, or blood type of the user.

17. The method of claim 1, wherein the emergency voice call is transmitted to the public safety answering point through a cellular network.

18. The method of claim 1, wherein the emergency voice call is transmitted to the public safety answering point through a public switched network.

19. The method of claim 1, wherein the emergency voice call is transmitted to the public safety answering point through an Internet protocol network.

20. The method of claim 1, further comprising transmitting location data to a communication data interface module at the public safety answering point.

21. The method of claim 1, wherein the location data is transmitted through a data link.

22. The method of claim 1, wherein the location data is transmitted through a voice link.

23. The method of claim 1, wherein the portable computing device is a personal data assistant, a cellular telephone, a smart phone, or a laptop computer.

24. A method of making a voice call from a portable computing device, comprising:
    determining with a processor of the portable computing device a location area identifier that represents a geographical area in which the portable computing device is located;
    determining with the processer a coverage area identifier that matches the location area identifier, wherein the coverage area identifier represents a service area being serviced by a call center;
    identifying with the processer a voice call destination number associated with the coverage area identifier; and
    utilizing with a dialing module of the portable computing device the voice call destination number in order to establish communication with the call center.

25. The method of claim 24, wherein the call center is a public safety answering point.

26. The method of claim 24, wherein location area identifier is a pixilated image.

27. The method of claim 24, wherein the geographical area is an irregular area.

28. The method of claim 24, wherein the emergency service area is an irregular area.

29. The method of claim 24, wherein the voice call destination number is a telephone number of the call center.

30. The method of claim 24, wherein the voice call destination number is an Internet protocol address.

* * * * *